(12) United States Patent
Tsukada

(10) Patent No.: US 12,046,988 B2
(45) Date of Patent: Jul. 23, 2024

(54) POWER SUPPLY SYSTEM AND MOVING BODY

(71) Applicant: HONDA MOTOR CO., LTD., Tokyo (JP)

(72) Inventor: Yoshinari Tsukada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 144 days.

(21) Appl. No.: 17/805,693

(22) Filed: Jun. 7, 2022

(65) Prior Publication Data

US 2022/0393566 A1 Dec. 8, 2022

(30) Foreign Application Priority Data

Jun. 8, 2021 (JP) ................................. 2021-095863

(51) Int. Cl.
| | |
|---|---|
| *H02P 21/22* | (2016.01) |
| *B60L 50/61* | (2019.01) |
| *H02M 1/00* | (2006.01) |
| *H02M 1/08* | (2006.01) |
| *H02M 3/158* | (2006.01) |
| *H02M 3/335* | (2006.01) |
| *H02M 7/537* | (2006.01) |
| *H02P 27/06* | (2006.01) |

(52) U.S. Cl.
CPC ........... *H02M 1/0054* (2021.05); *B60L 50/61* (2019.02); *H02M 1/08* (2013.01); *H02M 3/1582* (2013.01); *H02M 3/33573* (2021.05); *H02M 3/33584* (2013.01); *H02M 7/537* (2013.01); *H02P 27/06* (2013.01); *B60L 2210/30* (2013.01); *B60L 2210/40* (2013.01)

(58) Field of Classification Search
CPC .. H02M 1/0054; H02M 3/33573; H02M 1/08; H02M 3/1582; H02M 3/33584; H02M 7/537; B60L 50/61; B60L 2210/30; B60L 2210/40; H02P 27/06; H02P 21/22
See application file for complete search history.

(56) References Cited

U.S. PATENT DOCUMENTS

| | | | |
|---|---|---|---|
| 2016/0164440 A1* | 6/2016 | Kataoka | ..................... G05F 1/67 318/400.3 |
| 2021/0159804 A1* | 5/2021 | Yamada | ............ H02M 3/33573 |
| 2023/0014369 A1* | 1/2023 | Hiruma | .................... H02P 21/22 |

FOREIGN PATENT DOCUMENTS

WO 2019004015 A1 1/2019

* cited by examiner

*Primary Examiner* — Cortez M Cook
(74) *Attorney, Agent, or Firm* — CKC & Partners Co., LLC

(57) ABSTRACT

A power supply system 1 includes: a DC power supply 30; a variable voltage power supply 7 serving as an isolated bidirectional DC/DC converter that outputs power of a variable voltage E2 from a pair of secondary-side input/output terminals 72*p* and 72*n*; a positive electrode power line 21 and a negative electrode power line 22 that are connected to both electrodes of the DC power supply 30; a switching circuit 5 including a plurality of arm switching elements 51, 52, 53, and 54 that connect the power lines 21 and 22 and a load 4; a backflow prevention switching element 34 that is provided on the positive electrode power line 21 between the pair of secondary-side input/output terminals 72*p* and 72*n*; a power supply driver 6 that operates the variable voltage power supply 7 and the backflow prevention switching element 34; and a switching circuit driver 8.

20 Claims, 10 Drawing Sheets

POWER SUPPLY SYSTEM AND MOVING BODY

This application is based on and claims the benefit of priority from Japanese Patent Application No. 2021-095863, filed on 8 Jun. 2021, the content of which is incorporated herein by reference.

BACKGROUND OF THE INVENTION

Field of the Invention

The present invention relates to a power supply system and a moving body. More specifically, the present invention relates to a power supply system that supplies power to a load and a moving body in which the power supply system is equipped.

Related Art

For example, an electric vehicle is equipped with a power converter that converts DC power output from a battery into AC power and supplies the AC power to a rotating electric machine connected to drive wheels. Many power converters converts DC power into AC power by switching on/off of switching elements of at least two arms connected in series to a load, and thus switching loss occurring during turn-on and turn-off of the switching elements and steady loss proportional to on-resistance of the switching elements occur (for example, see Patent Document 1).

In the power converter disclosed in Patent Document 1, DC power output from a multi-stage DC chopper circuit is smoothed by a smoothing circuit, and then a loopback circuit makes a half-wave a negative voltage and combines a half-wave of a positive voltage and the half-wave of the negative voltage to generate AC power.

Patent Document 1: PCT International Publication No. WO2019/004015

SUMMARY OF THE INVENTION

However, since the power converter disclosed in Patent Document 1 uses a multi-stage DC chopper circuit, the number of switching elements increases in proportion to the number of stages of the DC voltage, and thus switching loss also increases accordingly.

Further, since on-resistance of the switching element tends to increase as a withstand voltage of the switching element increases, it is preferable to use a switching element having as low a withstand voltage as possible in order to reduce the steady loss. However, in general, the withstand voltage of the switching element needs to be sufficiently higher than the maximum voltage of the battery in consideration of a surge voltage generated at the time of turn-on or turn-off. For this reason, in the multi-stage DC chopper circuit disclosed in Patent Document 1, it is necessary to increase the withstand voltage of the switching element in proportion to the number of stages of the DC voltage, and thus the steady loss also increases accordingly.

An object of the present invention is to provide a power supply system and a moving body capable of reducing switching loss and steady loss as compared with the related art.

(1) A power supply system (for example, a power supply system 1 or 1A to be described below) according to the present invention includes: a DC power supply (for example, a DC power supply 30 to be described below) that outputs DC power; a first variable voltage power supply (for example, a variable voltage power supply 7, 7A, 7B, or 7C to be described below) that outputs power of a variable voltage (for example, a variable voltage E2 to be described below) from a pair of first terminals (for example, a pair of secondary-side input/output terminals 72$p$ and 72$n$, and 82$p$ and 82$n$ to be described below); a first power line (for example, a positive electrode power line 21 or a negative electrode power line 22 to be described below) and a second power line (for example, a negative electrode power line 22 or a positive electrode power line 21 to be described below) that are connected to both electrodes of the DC power supply, respectively; and a switching circuit (for example, a switching circuit 5 to be described below) including a plurality of arm switches (for example, arm switching elements 51, 52, 53, and 54 to be described below) that connect the first and second power lines and a load (for example, a load 4 to be described below), and the pair of first terminals are both connected to the first power line.

(2) In this case, preferably, the first variable voltage power supply includes a DC/DC converter that transforms power in a pair of second terminals (for example, a pair of primary-side input/output terminals 71$p$ and 71$n$ to be described below) and outputs the power from the pair of first terminals, and the pair of second terminals are connected to both electrodes of the DC power supply, respectively.

(3) In this case, preferably, the first variable voltage power supply includes an isolated bidirectional DC/DC converter including an insulation transformer (for example, an insulation transformer 70 to be described below), a primary-side circuit (for example, a primary-side circuit 71 to be described below) that connects a primary side of the insulation transformer and the pair of second terminals, and a secondary-side circuit (for example, a secondary-side circuit 72 to be described below) that connects a secondary side of the insulation transformer and the pair of first terminals, and the DC power supply is a secondary battery capable of performing both of discharging during which chemical energy is converted into electric energy and charging during which electric energy is converted into chemical energy.

(4) In this case, preferably, the first variable voltage power supply includes a front-stage converter (for example, a front-stage converter 73 to be described below) and a rear-stage converter (for example, a rear-stage converter 80 to be described below), the front-stage converter is an isolated bidirectional DC/DC converter including an insulation transformer, a primary-side circuit that connects a primary side of the insulation transformer and the pair of second terminals, and a secondary-side circuit that connects a secondary side of the insulation transformer and pair of primary-side input/output terminals (for example, a pair of primary-side input/output terminals 81$p$ and 81$n$ to be described below) of the rear-stage converter, the rear-stage converter is a bidirectional DC/DC converter capable of stepping up or down DC power between the pair of primary-side input/output terminals and the pair of second terminals (for example, a pair of secondary-side input/output terminals 82$p$ and 82$n$ to be described below) to bidirectionally input and output the DC power, and the DC power supply is a secondary battery capable of performing both of discharging during which chemical energy is converted into electric energy and charging during which electric energy is converted into chemical energy.

(5) In this case, preferably, a backflow prevention diode (for example, a backflow prevention switching element 34 or 34A to be described below) is provided on the first power line between the pair of first terminals to allow an output current of the DC power supply and cut off a current in an opposite direction to the output current.

(6) In this case, preferably, a backflow prevention diode (for example, a backflow prevention switching element 34 or 34A to be described below) and a switch (for example, a backflow prevention switching element 34 or 34A to be described below) are provided on the first power line between the pair of first terminals, the backflow prevention diode being configured to allow an output current of the DC power supply and cut off a current in an opposite direction to the output current, the switch being configured to interrupt a bypass line bypassing the backflow prevention diode.

(7) In this case, preferably, the power supply system further includes a power supply driver (for example, a power supply driver 6 or 6A to be described below) that changes the voltage between the pair of first terminals from 0 to a predetermined maximum voltage by operating the first variable voltage power supply.

(8) In this case, preferably, the power supply system further includes a switching circuit driver (for example, a switching circuit driver 8 or 8A to be described below) that operates the arm switch, and the switching circuit driver executes switching control to alternately turn on and off the arm switch within a period (for example, within a period indicated by Tsw in FIG. 4 to be described below) in which the voltage between the pair of first terminals is equal to or less than a predetermined voltage threshold value (for example, 0 [V]) or in which the output power of the first variable voltage power supply is not superimposed on the first and second power lines, and maintains the arm switch in either an on or off state within a period (for example, within a period indicated by Toff in FIG. 4 to be described below) in which the voltage between the pair of first terminals is higher than a predetermined voltage threshold value or in which the output power of the first variable voltage power supply is superimposed on the first and second power lines.

(9) In this case, preferably, the power supply system further includes a second variable voltage power supply (for example, a second variable voltage power supply 9B to be described below) that outputs power of a variable voltage from a pair of output terminals, and the pair of output terminals are both connected to the first power line or the second power line.

(10) A power supply system (for example, a power supply system 1 to be described below) according to the present invention converts DC power into AC power and supplies the power to a load (for example, a load 4 to be described below), the power supply system including: a power supply (for example, a multi-stage voltage power supply 3 to be described below) that outputs the DC power to a first power line (for example, a positive electrode power line 21 or a negative electrode power line 22 to be described below) and a second power line (for example, a negative electrode power line 22 or a positive electrode power line 21 to be described below); a switching circuit (for example, a switching circuit 5 to be described below) including a plurality of arm switches (for example, arm switching elements 51, 52, 53, and 54 to be described below) that connect the first and second power lines and the load; and a switching circuit driver (for example, a switching circuit driver 8 to be described below) that operates the arm switches, and the power supply superimposes power of a variable voltage (for example, a variable voltage E2 to be described below) on the DC power, and outputs power having a voltage that fluctuates in a predetermined cycle to the first and second power lines.

(11) In this case, preferably, the switching circuit driver executes switching control to alternately turn on and off the arm switch within a period (for example, within a period indicated by Tsw in FIG. 4 to be described below) in which the voltage between the first and second power lines is equal to or less than a predetermined voltage threshold value (for example, 0 [V]) or in which the power of a variable voltage is not superimposed on the first and second power lines, and maintains the arm switch in either an on or off state within a period (for example, within a period indicated by Toff in FIG. 4 to be described below) in which the voltage between the first and second power lines is higher than the predetermined voltage threshold value or in which the power of a variable voltage is superimposed on the first and second power lines.

(12) A moving body (for example, a vehicle V to be described below) according to the present invention includes: an AC rotating electrical machine (for example, an AC rotating electrical machine M to be described below) coupled to drive wheels; a DC power supply (for example, a battery B to be described below) that outputs DC power; a U-phase variable voltage power supply (for example, a U-phase variable voltage power supply 7U to be described below) that outputs power of a variable voltage; a V-phase variable voltage power supply (for example, a V-phase variable voltage power supply 7V to be described below) that outputs power of a variable voltage; a W-phase variable voltage power supply (for example, a W-phase variable voltage power supply 7W to be described below) that outputs power of a variable voltage; a first U-phase power line (for example, a first U-phase power line 51U to be described below) and a second U-phase power line (for example, a second U-phase power line 52U to be described below) that connect both ends of a U-phase leg (for example, a U-phase leg 5U to be described below) connected to a U-phase of the AC rotating electrical machine and both electrodes of the DC power supply; a first V-phase power line (for example, a first V-phase power line 51V to be described below) and a second V-phase power line (for example, a second V-phase power line 52V to be described below) that connect both ends of a V-phase leg (for example, a V-phase leg 5V to be described below) connected to a V-phase of the AC rotating electrical machine and both electrodes of the DC power supply; and a first W-phase power line (for example, a first W-phase power line 51W to be described below) and a second W-phase power line (for example, a second W-phase power line 52W to be described below) that connect both ends of a W-phase leg (for example, a W-phase leg 5W to be described below) connected to a W-phase of the AC rotating electrical machine and both electrodes of the DC power supply, the U-phase variable voltage power supply includes a pair of output terminals (for example, a pair of secondary-side input/output terminals 72Up and 72Un to be described below) connected to the first U-phase power line, the V-phase variable voltage power supply includes a pair of output terminals (for example, a pair of secondary-side input/output terminals 72Vp and 72Vn to be described below) connected to the first V-phase power line, and the W-phase variable voltage power supply includes a pair of output terminals (for example, a pair of secondary-side input/output terminals 72Wp and 72Wn to be described below) connected to the first W-phase power line.

(1) The power supply system according to the present invention includes the DC power supply, the switching circuit including the plurality of arm switches, which connect the first and second power lines connected to both electrodes of the DC power supply and the load, and the first variable voltage power supply that outputs the power of the variable voltage from the pair of first terminals. In the present invention, both of the pair of first terminals of the first variable voltage power supply are connected to the first power line, and thus the variable voltage of the first variable voltage power supply can be stacked on the DC voltage of the DC power supply. According to the present invention, since it is not necessary to operate the switching circuit in order to change the voltage applied to the load while the variable voltage is superimposed on the DC voltage of the DC power supply (that is, when the high voltage is applied), it is not necessary to increase the number of switches included in the switching circuit in a case of making the voltage multiple stages. For this reason, it is possible to reduce the number of switches in the switching circuit as compared with the case of making the voltage multiple stages by the multi-stage DC chopper circuit as disclosed in Patent Document 1, for example, and thus it is possible to reduce switching loss and steady loss to that extent.

Further, according to the present invention, as described above, it is not necessary to operate the switching circuit to change the voltage during the high-voltage application, and thus it is not necessary to consider a surge voltage during the high-voltage application in a case of designing the withstand voltage of the switch included in the switching circuit. Therefore, according to the present invention, it is possible to lower the withstand voltage of the switch included in the switching circuit as compared with the case of making the voltage multiple stages by the multi-stage DC chopper circuit as disclosed in Patent Document 1, for example, and thus it is possible to reduce steady loss in the switch and to further reduce costs of the switch.

Further, according to the present invention, as described above, it is not necessary to operate the switching circuit to change the voltage during the high-voltage application, and thus a high frequency component of the voltage applied to the load can be reduced, whereby it is also possible to reduce iron loss.

(2) In the present invention, the first variable voltage power supply includes the DC/DC converter that transforms the power in the pair of second terminals and outputs the power of the variable voltage from the pair of first terminals, and the pair of second terminals of the first variable voltage power supply are connected to both electrodes of the DC power supply. In other words, in the present invention, the first variable voltage power supply transforms the power output from the DC power supply and outputs the power of the variable voltage. Therefore, according to the present invention, it is possible to make the voltage multiple stages by one DC power supply.

(3) In the present invention, the first variable voltage power supply includes the isolated bidirectional DC/DC converter including the insulation transformer, the primary-side circuit that connects the primary side of the insulation transformer and the pair of second terminals, and the secondary-side circuit that connects the secondary side of the insulation transformer and the pair of first terminals, and the DC power supply is the secondary battery that can be charged and discharged. Therefore, according to the present invention, when the power output from the load is a low voltage lower than the upper-limit charging voltage of the secondary battery, the power output from the load is directly supplied to the secondary battery, and when the power output from the load is a high voltage higher than the upper-limit charging voltage of the secondary battery, the power output from the load can be stepped down by the first variable voltage power supply and supplied to the secondary battery.

(4) In the present invention, the first variable voltage power supply is used by a combination of the front-stage converter serving as the isolated bidirectional DC/DC converter and the rear-stage converter serving as the bidirectional DC/DC converter in series from the DC power supply to the first power line, and the DC power supply is the secondary battery that can be charged and discharged. Therefore, according to the present invention, during regeneration in which the power output from the load is supplied to the DC power supply which is the secondary battery, since the DC power on the first power line can be stepped up or stepped down by the rear-stage converter and supplied to the front-stage converter, it is possible to make the control range during regeneration equal to the control range during power running in which the power output from the DC power supply is supplied to the load.

(5) In the present invention, the backflow prevention diode is provided on the first power line between the pair of first terminals to allow the output power of the DC power supply and cut off the current in the opposite direction to the output current. Therefore, according to the present invention, it is possible to prevent the pair of first terminals from being short-circuited when the power of the variable voltage is output from the pair of first terminals of the first variable voltage power supply.

(6) In the present invention, the backflow prevention diode as described above and the switch for interrupting the bypass line bypassing the backflow prevention diode are provided on the first power line between the pair of first terminals. Therefore, according to the present invention, when the power of the variable voltage is output from the pair of first terminals of the first variable voltage power supply, it is possible to prevent the pair of first terminals from being short-circuited as described above, and when the power is output from the load, the switch can be turned on to supply the power, which is output from the load, to the DC power supply.

(7) The power supply system according to the present invention includes the power supply driver that changes the voltage between the pair of first terminals from 0 to the predetermined maximum voltage by operating the first variable voltage power supply. According to the present invention, since the waveform of the variable voltage of the power output from the first variable voltage power supply can be shaped into a favorable waveform by the power supply driver, it is possible to supply the AC power with the favorable waveform without operating the plurality of arm switches in the switching circuit while the variable voltage is superimposed.

(8) In the present invention, the switching circuit driver executes the switching control to alternately turn on and off the arm switch within the period in which the voltage between the pair of first terminals is equal to or less than the predetermined voltage threshold value or in which the output power of the first variable voltage power supply is not superimposed, and maintains the arm switch in either an on or off state within the period in which the voltage between the pair of first terminals is higher than the predetermined voltage threshold value or in which the output power of the first variable voltage power supply is superimposed. In other words, in the present invention, the switching circuit driver can stop the execution of the switching control during the high-voltage application to further reduce the switching loss and the steady loss in the switching circuit.

(9) In the present invention, the pair of output terminals of the second variable voltage power supply that outputs the power of the variable voltage are connected to the first power line or the second power line. Thereby, it is possible to further increase the number of stages of the voltage without increasing the number of arm switches in the switching circuit.

(10) The power supply system according to the present invention includes the power supply that outputs the DC power to the first power line and the second power line, the switching circuit including the plurality of arm switches that connect the first and second power lines and the load, and the switching circuit driver that operates the arm switches. In the present invention, the power supply superimposes the power of the variable voltage on the DC power, and outputs the power having the voltage that fluctuates in the predetermined cycle to the first and second power lines. Therefore, according to the present invention, the switching circuit driver does not need to operate the arm switches in order to change the voltage applied to the load while the power of the variable voltage is superimposed on the DC power. Therefore, according to the present invention, as in the invention according to (1) described above, since it is not necessary to increase the number of arm switches included in the switching circuit when the voltage is increased in multiple stages, the switching loss and the steady loss can be reduced accordingly. Further, according to the present invention, as in the invention according to (1) described above, since the withstand voltage of the switches included in the switching circuit can be lowered, the steady loss in the switches can be lowered, and the costs of the switches can also be reduced. Further, according to the present invention, as in the invention according to (1) described above, the high frequency component of the voltage applied to the load can be reduced, whereby the iron loss can also be reduced.

(11) In the present invention, the switching circuit driver executes the switching control to alternately turn on and off the arm switch within the period in which the voltage between the first and second power lines is equal to or less than the predetermined voltage threshold value or in which the voltage of the variable voltage power supply is not superimposed on the first and second power lines, and maintains the arm switch in either an on or off state within the period in which the voltage between the first and second power lines is higher than the predetermined voltage threshold value or in which the voltage of the variable voltage power supply is superimposed on the first and second power lines. In other words, in the present invention, the switching circuit driver can stop the execution of the switching control during the high-voltage application to further reduce the switching loss and the steady loss in the switching circuit.

(12) The vehicle according to the present invention includes the AC rotating electrical machine, the DC power supply, the U-phase variable voltage power supply, the V-phase variable voltage power supply, the W-phase variable voltage power supply, the first and second U-phase power lines, the first and second V-phase power lines, and the first and second W-phase power lines. In the present invention, the pair of output terminals of the U-phase variable voltage power supply are connected to the first U-phase power line, the pair of output terminals of the V-phase variable voltage power supply are connected to the first V-phase power line, and the pair of output terminals of the W-phase variable voltage power supply are connected to the first W-phase power line. According to the present invention, as in the invention according to (1) described above, since it is not necessary to increase the number of arm switches included in the legs of the respective phases when the voltage is increased in multiple stages, the switching loss and the steady loss in the legs of the respective phases can be reduced accordingly. Further, according to the present invention, as in the invention according to (1) described above, since the withstand voltage of the switches included in the legs of the respective phases can be lowered, the steady loss in the switches can be lowered, and the costs of the switches can also be reduced. Further, according to the present invention, as in the invention according to (1) described above, since it is not necessary to operate the arm switches included in the legs of the respective phases in order to change the voltage during the high-voltage application, the high frequency component of the voltage applied to the AC rotating electrical machine can be reduced, whereby the iron loss can also be reduced.

DETAILED DESCRIPTION OF THE INVENTION

First Embodiment

A power supply system according to a first embodiment of the present invention will be described below with reference to the drawings.

Figure 1:
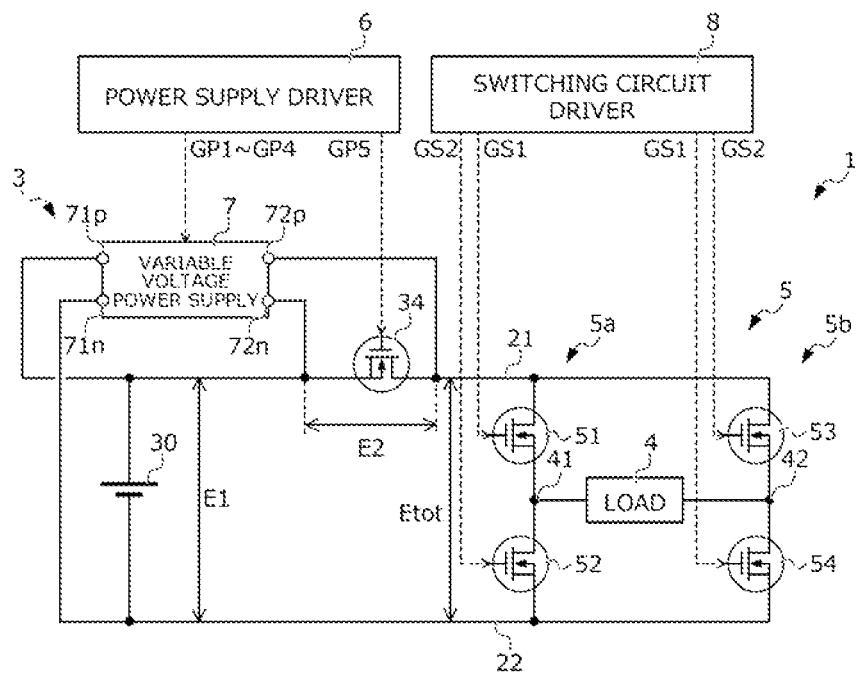
FIG. 1 is a diagram showing a circuit configuration of a power supply system according to a first embodiment of the present invention.

FIG. 1 is a diagram showing a circuit configuration of a power supply system 1 according to the present embodiment. The power supply system 1 includes a multi-stage voltage power supply 3 that outputs DC power of a multi-stage voltage to a positive electrode power line 21 and a negative electrode power line 22, a switching circuit 5 that connects power lines 21 and 22 with a load 4, a power supply driver 6 that operates the multi-stage voltage power supply 3, and a switching circuit driver 8 that operates the switching circuit 5. The power supply system 1 operates the multi-stage voltage power supply 3 and the switching circuit 5 with the drivers 6 and 8 to convert the DC power output from the multi-stage voltage power supply 3 to the power lines 21 and 22 into AC power and supply it to the load 4, or to convert the AC power output from the load 4 into DC power and supply it to the multi-stage voltage power supply 3.

In the following description, a case will be described in which the load 4 is an AC rotating electrical machine that converts AC power supplied from the power lines 21 and 22 into mechanical energy of a rotating shaft during power running, and that converts the mechanical energy of the rotating shaft into AC power and outputs it to the power lines 21 and 22 during regeneration, but the present invention is not limited thereto.

The switching circuit 5 includes two legs 5a and 5b that are used to connect the positive electrode power line 21 and the negative electrode power line 22. The a-phase leg 5a includes an a-phase upper arm switching element 51 and an a-phase lower arm switching element 52 that are connected in series from the positive electrode power line 21 toward the negative electrode power line 22 in this order. The b-phase leg 5b is connected to the power lines 21 and 22 so as to be in parallel with the a-phase leg 5a. The b-phase leg 5b includes a b-phase upper arm switching element 53 and a b-phase lower arm switching element 54 that are connected in series from the positive electrode power line 21 toward the negative electrode power line 22 in this order.

A first input/output terminal 41 of the load 4 is connected to a midpoint of the a-phase leg 5a, that is, a connection point between the a-phase upper arm switching element 51 and the a-phase lower arm switching element 52. In other words, the a-phase upper arm switching element 51 connects the positive electrode power line 21 and the first input/output terminal 41 of the load 4, and the a-phase lower arm switching element 52 connects the negative electrode power line 22 and the first input/output terminal 41 of the load 4. Further, a second input/output terminal 42 of the load 4 is connected to a midpoint of the b-phase leg 5b, that is, a connection point between the b-phase upper arm switching element 53 and the b-phase lower arm switching element 54. In other words, the b-phase upper arm switching element 53 connects the positive electrode power line 21 and the second input/output terminal 42 of the load 4, and the b-phase lower arm switching element 54 connects the negative electrode power line 22 and the second input/output terminal 42 of the load 4.

Each of these switching elements 51, 52, 53, and 54 is switched on or off according to on/off of a gate drive signal GS1 or GS2 input from the switching circuit driver 8. More specifically, the a-phase upper arm switching element 51 and the b-phase lower arm switching element 54 are switched on or off according to on/off of the gate drive signal GS1 input from the switching circuit driver 8, and the b-phase upper arm switching element 53 and the a-phase lower arm switching element 52 are switched on or off according to on/off of the gate drive signal GS2 input from the switching circuit driver 8. In the present embodiment, a case will be described in which an N-channel MOSFET including a body diode, which allows a current from a source to a drain, is used as these switching elements 51 to 54, but the present invention is not limited thereto. As these switching elements 51 to 54, a known switching element such as an IGBT or a JFET may be used in addition to the MOSFET.

Further, as will be described below, these switching elements 51 to 54 do not necessary to perform switching control at the time of high-voltage output of the multi-stage voltage power supply 3. For this reason, withstand voltage performance of these switching elements 51 to 54 is designed depending on an output voltage E1 of a DC power supply 30 to be described below.

Drains of the upper arm switching elements 51 and 53 are connected to the positive electrode power line 21, and sources of the upper arm switching elements 51 and 53 are connected to the first input/output terminal 41 and the second input/output terminal 42 of the load 4, respectively. Sources of the lower arm switching elements 52 and 54 are connected to the negative electrode power line 22, drains of the lower arm switching elements 52 and 54 are connected to the first input/output terminal 41 and the second input/output terminal 42 of the load 4, respectively. Thereby, the body diode of each of the switching elements 51 to 54 acts as a freewheeling diode.

The multi-stage voltage power supply 3 includes a DC power supply 30 that outputs DC power, a variable voltage power supply 7 that outputs DC power of a variable voltage that fluctuates in a predetermined cycle, and a backflow prevention switching element 34. The multi-stage voltage power supply 3 is a three-level DC voltage power supply that can output DC voltages of three stages of 0 [V], E1 [V] (hereinafter, an output voltage of the DC power supply 30 being referred to as E1), and E1+E2 [V] (hereinafter, a variable voltage output from the variable voltage power supply 7 being referred to as E2), according to a circuit configuration to be described below.

A positive electrode of the DC power supply 30 is connected to the positive electrode power line 21, and a negative electrode of the DC power supply 30 is connected to the negative electrode power line 22. The DC power supply 30 outputs DC power of a predetermined voltage E1 to the power lines 21 and 22. In the present embodiment, a case will be described in which the DC power supply 30 is a secondary battery capable of performing both of discharging during which chemical energy is converted into electric energy and charging during which electric energy is converted into chemical energy, but the present invention is not limited thereto. For example, as the DC power supply 30, a fuel cell may be used that generates electricity when an oxygen-containing oxidant gas and a hydrogen gas are supplied.

The variable voltage power supply 7 includes, for example, a pair of primary-side input/output terminals 71p and 71n and a pair of secondary-side input/output terminals 72p and 72n that are isolated from each other, and an isolated bidirectional DC/DC converter is used that can bidirectionally input and output DC power between the pair of primary-side input/output terminals 71p and 71n and the pair of secondary-side input/output terminals 72p and 72n. In other words, during power running of the load 4, the variable voltage power supply 7 transforms the DC power in the pair of primary-side input/output terminals 71p and 71n and outputs the power of the variable voltage E2 from the pair of secondary-side input/output terminals 72p and 72n, and during regeneration of the load 4, the variable voltage power supply 7 transforms the DC power in the pair of secondary-side input/output terminals 72p and 72n and outputs the DC power from the pair of primary-side input/output terminals 71p and 71n.

As shown in FIG. 1, both of the pair of secondary-side input/output terminals 72p and 72n of the variable voltage power supply 7 are connected to the positive electrode power line 21 between the DC power supply 30 and the switching circuit 5. More specifically, the secondary-side positive electrode input/output terminal 72p of the variable voltage power supply 7 is connected to the positive electrode power line 21 on a high-potential side as compared with the secondary-side negative electrode input/output terminal 72n (that is, on a side closer to the switching circuit 5 as compared with the secondary-side negative electrode input/output terminal 72n). In the present embodiment, the case has been described in which both of the pair of secondary-side input/output terminals 72p and 72n are connected to the positive electrode power line 21, but the present invention is not limited thereto. Both of the pair of secondary-side input/output terminals 72p and 72n of the variable voltage power supply 7 may be connected to the negative electrode power line 22 between the DC power supply 30 and the switching circuit 5.

The backflow prevention switching element 34 is provided between the pair of secondary-side input/output terminals 72p and 72n on the positive electrode power line 21. The switching element 34 is switched on or off according to on/off of a gate drive signal GP5 input from the power supply driver 6. In the present embodiment, a case will be described in which an N-channel MOSFET including a body diode, which has a withstand voltage performance similar to that of the switching elements 51 to 54 and allows a current from a source to a drain, is used as the switching element 34, but the present invention is not limited thereto. As the switching element 34, a known switching element such as an IGBT or a JFET may be used in addition to the MOSFET.

The drain of the switching element 34 is connected to the secondary-side positive electrode input/output terminal 72p, and the source of the switching element 34 is connected to the secondary-side negative electrode input/output terminal 72n. For this reason, the body diode of the switching element 34 acts as a backflow prevention diode that allows an output current of the DC power supply 30 (a current flowing from the DC power supply 30 to the switching circuit 5 through the positive electrode power line 21) and cuts off a reverse current in an opposite direction to the output current. Further, the switching element 34 is switched on or off according to on/off of a gate drive signal GP5, and thus the switching element 34 can act as a switch for interrupting a bypass line bypassing the backflow prevention diode.

Further, as shown in FIG. 1, the pair of primary-side input/output terminals 71p and 71n of the variable voltage power supply 7 are connected to both positive and negative electrodes of the DC power supply 30. More specifically, the primary-side positive electrode input/output terminal 71p of the variable voltage power supply 7 is connected to the positive electrode of the DC power supply 30, and the primary-side negative electrode input/output terminal 71n of the variable voltage power supply 7 is connected to the negative electrode of the DC power supply 30. In the present embodiment, the case has been described in which the pair of primary-side input/output terminals 71p and 71n are connected to both the positive and negative electrodes of the DC power supply 30, but the present invention is not limited thereto. The pair of primary-side input/output terminals 71p and 71n of the variable voltage power supply 7 may be connected to both positive and negative electrodes of a power supply different from the DC power supply 30.

Figure 2:
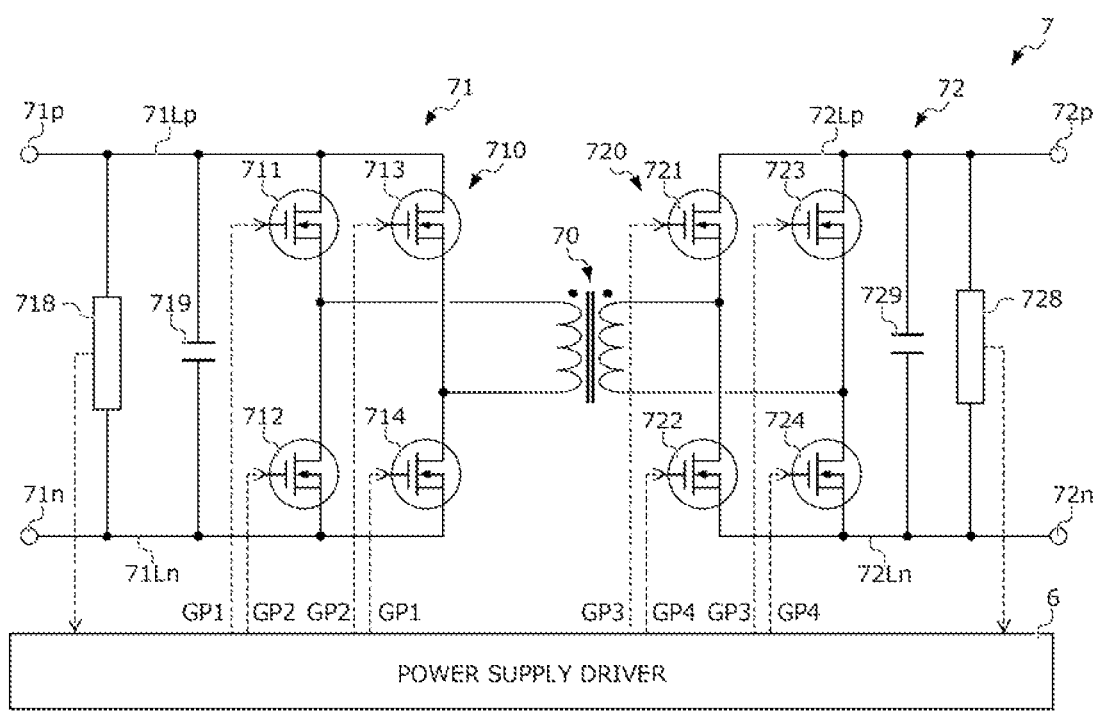
FIG. 2 is a diagram showing an example of a circuit configuration of a variable voltage power supply.

Next, a more detailed configuration of the variable voltage power supply 7 will be described with reference to FIG. 2. FIG. 2 is a diagram showing an example of the circuit configuration of the variable voltage power supply 7. FIG. 2 shows a case where the variable voltage power supply 7 is a so-called full bridge isolated bidirectional DC/DC converter. In the following description, a DC/DC converter of a voltage type will be described as an example, but the present invention is not limited thereto. The DC/DC converter may be a current type.

The variable voltage power supply 7 shown in FIG. 2 includes an insulation transformer 70 having a primary coil and a secondary coil, a primary-side circuit 71 in which the primary side of the insulation transformer 70 is connected to the pair of primary-side input/output terminals 71p and 71n, and a secondary-side circuit 72 in which the secondary side of the insulation transformer 70 is connected to the pair of secondary-side input/output terminals 72p and 72n.

The primary-side circuit 71 includes a positive electrode power line 71Lp connected to the primary-side positive electrode input/output terminal 71p, a negative electrode power line 71Ln connected to the primary-side negative electrode input/output terminal 71n, a primary-side full bridge circuit 710 in which these power lines 71Lp and 71Ln are connected to the primary coil of the insulation transformer 70, and a primary-side voltage sensor 718 and a smoothing capacitor 719 that are connected to each other in parallel between the positive electrode power line 71Lp and the negative electrode power line 71Ln. The primary-side voltage sensor 718 transmits a voltage detection signal corresponding to a voltage between the power lines 71Lp and 71Ln to the power supply driver 6.

The primary-side full bridge circuit 710 includes four switching elements 711, 712, 713, and 714 constituting the full bridge circuit on the primary side of the insulation transformer 70. Each of these switching elements 711 to 714 is switched on or off according to on/off of gate drive signals GP1 and GP2 input from the power supply driver 6. More specifically, the switching elements 711 and 714 are switched on or off according to on/off of the gate drive signal GP1 input from the power supply driver 6, and the switching elements 712 and 713 are switched on or off according to on/off of the gate drive signal GP2 input from the power supply driver 6. In the present embodiment, a case has been described in which an N-channel MOSFET including the body diode, which allows a current from a source to a drain, is used as the switching elements 711 to 714, but the present invention is not limited thereto. As these switching elements 711 to 714, a known switching element such as an IGBT or a JFET may be used in addition to the MOSFET.

Drains of the switching elements 711 and 713 are connected to the positive electrode power line 71Lp, and sources of the switching elements 711 and 713 are connected to both ends of the primary coil of the insulation transformer 70, respectively. Sources of the switching elements 712 and 714 are connected to the negative electrode power line 71Ln, and drains of the switching elements 712 and 714 are connected to both ends of the primary coil of the insulation transformer 70, respectively.

The secondary-side circuit 72 includes a positive electrode power line 72Lp connected to the secondary-side positive electrode input/output terminal 72p, a negative electrode power line 72Ln connected to the secondary-side negative electrode input/output terminal 72n, a secondary-side full bridge circuit 720 in which these power lines 72Lp and 72Ln are connected to the secondary coil of the insulation transformer 70, and a secondary-side voltage sensor 728 and a smoothing capacitor 729 that are connected to each other in parallel between the positive electrode power line 72Lp and the negative electrode power line 72Ln. The secondary-side voltage sensor 728 transmits a voltage detection signal corresponding to a voltage between the power lines 72Lp and 72Ln to the power supply driver 6.

The secondary-side full bridge circuit 720 includes four switching elements 721, 722, 723, and 724 constituting the full bridge circuit on the secondary side of the insulation transformer 70. Each of these switching elements 721 to 724 is switched on or off according to on/off of gate drive signals GP3 and GP4 input from the power supply driver 6. More specifically, the switching elements 721 and 724 are switched on or off according to on/off of the gate drive signal GP3 input from the power supply driver 6, and the switching elements 722 and 723 are switched on or off according to on/off of the gate drive signal GP4 input from the power supply driver 6. In the present embodiment, a case has been described in which an N-channel MOSFET including the body diode, which allows a current from a source to a drain, is used as the switching elements 721 to 724, but the present invention is not limited thereto. As these switching elements 721 to 724, a known switching element such as an IGBT or a JFET may be used in addition to the MOSFET.

Drains of the switching elements 721 and 723 are connected to the positive electrode power line 72Lp, and sources of the switching elements 721 and 723 are connected to both ends of the secondary coil of the insulation transformer 70, respectively. Sources of the switching elements 722 and 724 are connected to the negative electrode power line 72Ln, and drains of the switching elements 722 and 724 are connected to both ends of the secondary coil of the insulation transformer 70, respectively.

During power running of the load 4, the variable voltage power supply 7 as described above turns on/off the switching elements 711, 712, 713, and 714 of the primary-side circuit 71 by the gate drive signals GP1 and GP2 input from the power supply driver 6 and causes the secondary-side circuit 72 to operate as a rectifier circuit by the body diode of the switching elements 721, 722, 723, and 724, thereby transforming the DC power in the pair of primary-side input/output terminals 71p and 71n and outputting the power of the variable voltage E2 from the pair of secondary-side input/output terminals 72p and 72n. Further, during regeneration of the load 4, the variable voltage power supply 7 turns on/off the switching elements 721, 722, 723, and 724 of the secondary-side circuit 72 by the gate drive signals GP3 and GP4 input from the power supply driver 6 and causes the primary-side circuit 71 to operate as a rectifier circuit by the body diode of the switching elements 711, 712, 713, and 714, thereby transforming the DC power in the pair of secondary-side input/output terminals 72p and 72n and outputting the DC power from the pair of primary-side input/output terminals 71p and 71n.

Figure 3:
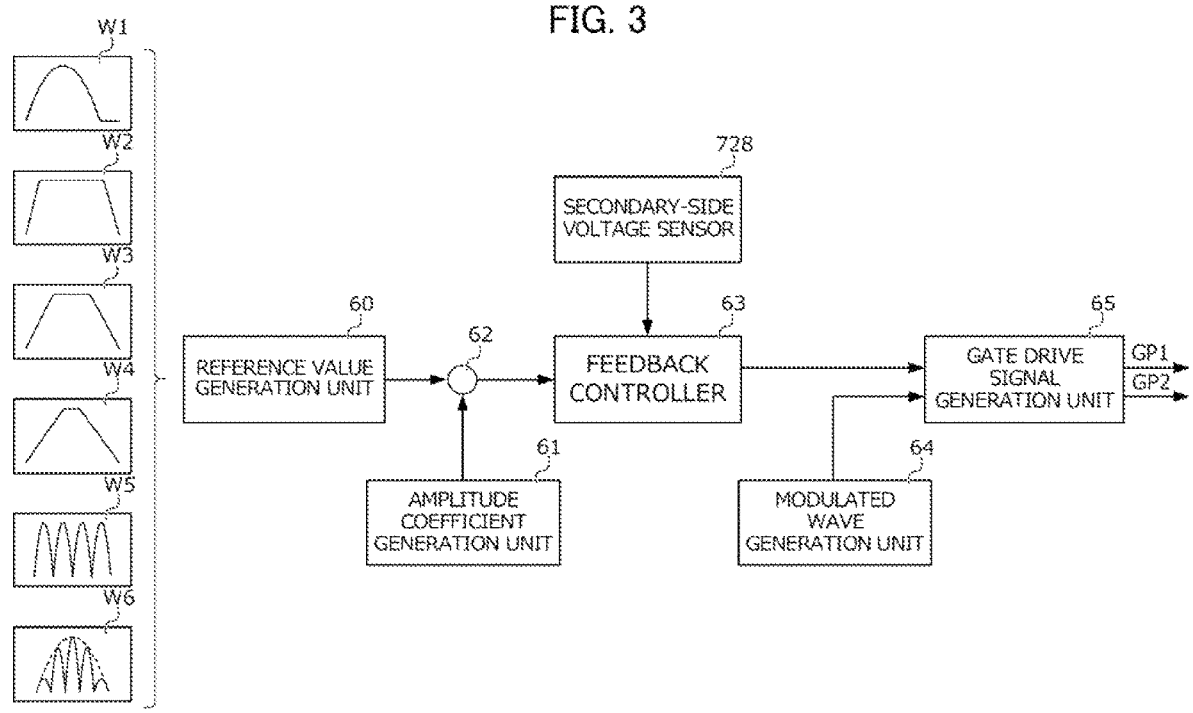
FIG. 3 is a functional block diagram showing a configuration of a power supply driver.

FIG. 3 is a functional block diagram showing a configuration of the power supply driver 6. More specifically, FIG. 3 shows only portions of the power supply driver 6, which operates the variable voltage power supply 7 and the backflow prevention switching element. 34, related to the operation of the variable voltage power supply 7 during power running of the load 4 in particular.

The power supply driver 6 includes a reference value generation unit 60, an amplitude coefficient generation unit 61, a multiplication unit 62, a feedback controller 63, a modulated wave generation unit 64, and a gate drive signal generation unit 65. During power running of the load 4, the power supply driver 6 inputs the gate drive signals GP1 and GP2, which are generated using the reference value generation unit 60, the amplitude coefficient generation unit 61, the multiplication unit 62, the feedback controller 63, the modulated wave generation unit 64, and the gate drive signal generation unit 65, to the switching elements 711 to 714 of the primary-side circuit 71 of the variable voltage power supply 7, and operates these switching elements 711 to 714, thereby controlling a waveform of the variable voltage E2 output from the pair of secondary-side input/output terminals 72p and 72n.

The reference value generation unit 60 selects one of plurality of predetermined reference waveform profile data W1 to W6, calculates a control reference value based on the selected reference waveform profile data, and outputs the calculated control reference value to the multiplication unit 62. These reference waveform profile data W1 to W6 serve as a norm of the waveform of the variable voltage E2 output from the pair of secondary-side input/output terminals 72p and 72n during power running of the load 4.

The amplitude coefficient generation unit 61 outputs a preset amplitude coefficient to the multiplication unit 62. The amplitude coefficient is a coefficient that is used to determine an amplitude of the variable voltage E2, that is, the maximum value of the variable voltage E2, and is determined between 0 to 1.

The multiplication unit 62 multiplies the control reference value output from the reference value generation unit 60 by the amplitude coefficient output from the amplitude coefficient generation unit 61 to calculate a target value of the variable voltage E2, and outputs the target value to the feedback controller 63.

The feedback controller 63 generates a correction signal according to a known feedback control algorithm (for example, a PID control rule) such that there is no deviation between the voltage value detected by the secondary-side voltage sensor 728 and the target value output from the multiplication unit 62, and outputs the correction signal to the gate drive signal generation unit 65.

The modulated wave generation unit 64 generates a modulated wave signal according to known modulated wave generation algorithms (for example, a PWM modulation algorithm, a PDM modulation algorithm, and a Δ-Σ modulation algorithm), and outputs the modulated wave signal to the gate drive signal generation unit 65.

The gate drive signal generation unit 65 generates, based on a comparison between the correction signal output from the feedback controller 63 and the modulated wave signal output from the modulated wave generation unit 64, the gate drive signal GP1 and the gate drive signal GP2, and inputs the generated signals to the switching elements 711 to 714, wherein the gate drive signal GP1 is used for driving the switching elements 711 and 714 of the primary-side circuit 71, and the gate drive signal GP2 is the gate drive signal for driving the switching elements 712 and 713 of the primary-side circuit 71 and has on/off inverted to that of the gate drive signal GP1.

The power supply driver 6 generates the gate drive signals GP1 and GP2 according to the procedure described above during power running of the load 4, and outputs the variable voltage E2 of the waveform selected by the reference value generation unit 60 from the pair of secondary-side input/output terminals 72p and 72n.

Next, returning to FIG. 1, control procedures of the power supply system 1 during power running and during regeneration of the load 4 will be described separately for during low-voltage input/output and during high-voltage input/output, respectively.

First, a control procedure will be described at the time of power running of the load 4 and at the time of low-voltage output in which the voltage of the DC power output from the multi-stage voltage power supply 3 to the power lines 21 and 22 is less than the output voltage E1 of the DC power supply 30.

In this case, the power supply driver 6 turns off both the variable voltage power supply 7 and the backflow prevention switching element 34 by turning off all of the gate drive signals GP1 to GP5. Thus, a voltage between the pair of secondary-side input/output terminals 72p and 72n of the variable voltage power supply 7 becomes substantially 0, and the DC power of the voltage E1 is supplied from the DC power supply 30 to the power lines 21 and 22. In this case, the switching circuit driver 8 inputs the gate drive signals GS1 and GS2 generated according to a known inverter control algorithm to the switching elements 51 to 54 of the switching circuit 5, and turns on/off the switching elements 51 to 54, thereby converting the DC power in the power lines 21 and 22 into AC power and supplying it to the load 4.

Next, referring to FIG. 4, a control procedure will be described at the time of power running of the load 4 and at the time of high-voltage output in which the voltage of the DC power output from the multi-stage voltage power supply 3 to the power lines 21 and 22 is equal to or more than the output voltage E1 of the DC power supply 30. More specifically, a case will be described below in which sinusoidal AC power (see the lowermost stage in FIG. 4 to be described below) having a maximum voltage twice the output voltage E1 of the DC power supply 30 is supplied to the load 4.

Figure 4:
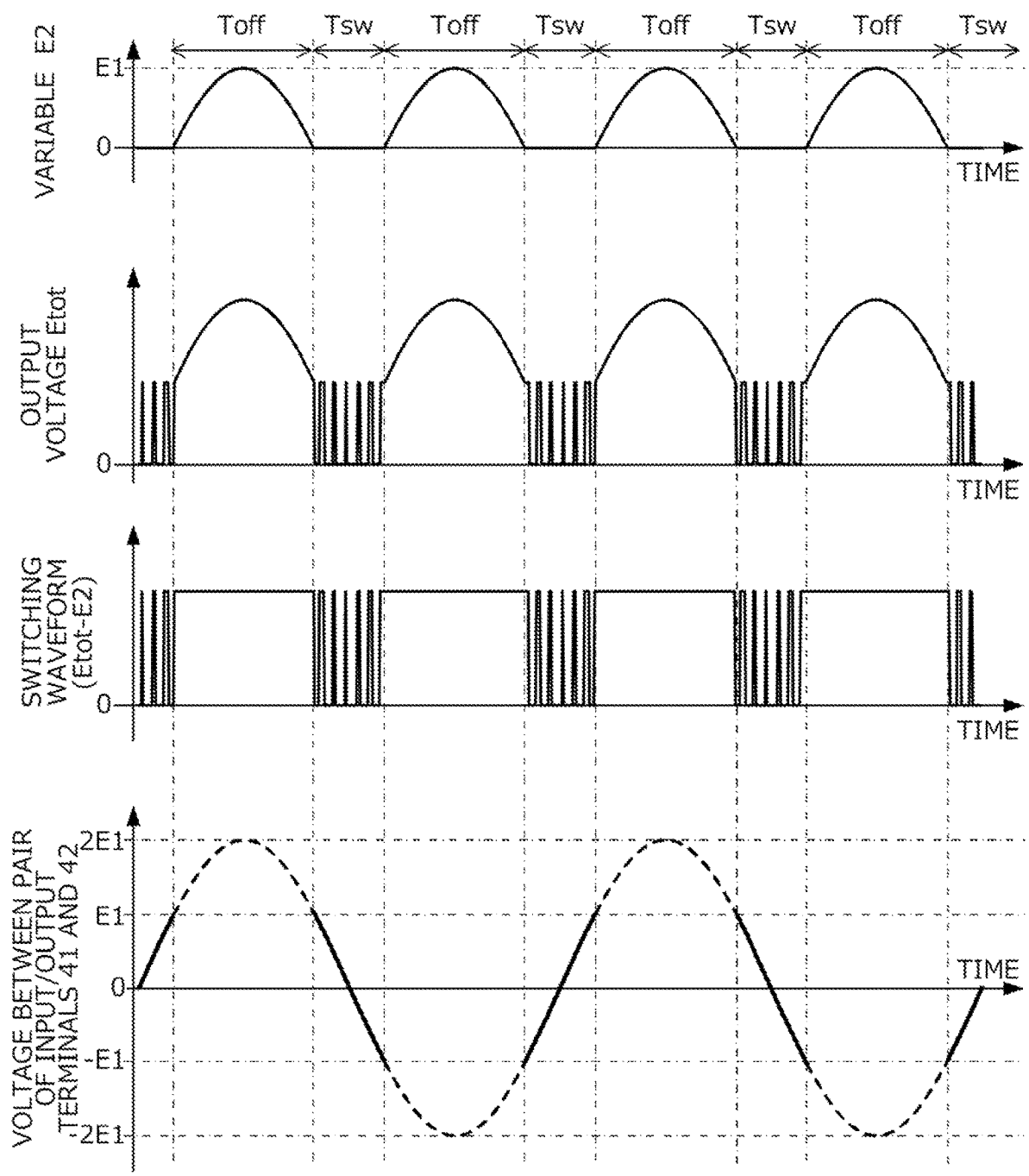
FIG. 4 is an example of a time chart showing a change in voltage of each portion during power running of a load and at the time of high-voltage output of a multi-stage voltage power supply.

FIG. 4 shows an example of a time chart showing a change in voltage of each portion during power running of the load 4 and at the time of high-voltage output of the multi-stage voltage power supply 3. The uppermost stage in FIG. 4 shows a time change of the variable voltage E2 (that is, the voltage between the pair of secondary-side input/output terminals 72p and 72n) output from the variable voltage power supply 7, a second stage from the top in FIG. 4 shows a time change of an output voltage Etot (that is, a voltage between the power lines 21 and 22) of the multi-stage voltage power supply 7, a third stage from the top in FIG. 4 shows a time change of a switching waveform by the switching circuit driver 8, that is, a voltage obtained by removing the variable voltage E2 from the output voltage Etot of the multi-stage voltage power supply 7, and the lowermost stage in FIG. 4 shows a time change in the voltage applied to the load, that is, the voltage between a pair of input/output terminals 41 and 42.

At the time of such high-voltage output, under control of the power supply driver 6, the multi-stage voltage power supply 7 superimposes the variable voltage power output from the variable voltage power supply 7 on the DC power output from the DC power supply 30, and outputs the DC power having the voltage fluctuating in a predetermined cycle to the power lines 21 and 22. More specifically, the power supply driver 6 operates the variable voltage power supply 7 such that the variable voltage E2 between the pair of secondary-side input/output terminals 72p and 72n fluctuates from 0 to a predetermined maximum voltage (in the example of FIG. 4, twice the output voltage E1 of the DC power supply 30) in a cycle.

For example, when AC power having an output waveform as shown at the lowermost stage in FIG. 4 is supplied to the load 4, the power supply driver 6 generates the gate drive signals GP1 and GP2 according to the procedure described with reference to FIG. 3 such that the waveform of the variable voltage E2 between the pair of secondary-side input/output terminals 72p and 72n becomes equal to the waveform of the portion of the final output waveform whose amplitude exceeds the output voltage E1 of the DC power supply 30, that is, such that the variable voltage E2 having the waveform as shown at the uppermost stage in FIG. 4 is output from the variable voltage power supply 7 to the pair of secondary-side terminals 72p and 72n, and operates the primary-side circuit 71 of the variable voltage power supply 7 by these gate drive signals GP1 and GP2. Further, the power supply driver 6 turns off the gate drive signal GP5 during power running of the load 4, and thus turns off the backflow prevention switching element 34. Thereby, the power lines 21 and 22 are supplied with the power in which the DC power of the variable voltage E2 output from the variable voltage power supply 7 is superimposed on the DC power of the voltage E1 output from the DC power supply 30.

Further, at the time of high-voltage output, the switching circuit driver 8 inputs the gate drive signals GS1 and GS2 generated according to the known inverter control algorithm to the switching elements 51 to 54 of the switching circuit 5 such that AC power having a voltage, which fluctuates from E1 [V] to −E1 [V], is supplied to the load 4 within a period in which the variable voltage E2 between the pair of secondary-side input/output terminals 72p and 72n is equal to or less than a predetermined voltage threshold value (in the example of FIG. 4, 0 [V]) or less, in other words, within a period in which the output power of the variable voltage power supply 7 is not superimposed on the power lines 21 and 22 (within a period indicated by "Tsw" in FIG. 4), and alternately and repeatedly executes on/off switching control of these switching elements 51 to 54 (see the second stage and the third stage from the top in FIG. 4). Therefore, among the AC power supplied to the load 4, a waveform in which an absolute value of the voltage is E1 [V] or less (a waveform indicated by a thick solid line at the lowermost stage in FIG. 4) is realized by the switching control of the switching circuit 5 by the switching circuit driver 8.

In addition, the switching circuit driver 8 inputs the gate drive signals GS1 and GS2 generated, such that the positive or negative voltage is continuously applied to the load 4, to the switching elements 51 to 54 in a period in which the variable voltage E2 between the pair of secondary-side input/output terminals 72p and 72n is higher than the predetermined voltage threshold value (in the example of FIG. 4, 0 [V]) (within a period indicated by "Toff" in FIG. 4), in other words, within a period in which the output power of the variable voltage power supply 7 is superimposed on the power lines 21 and 22, and maintains these switching elements 51 to 54 in either an on or off state. In other words, within this period, the switching circuit driver 8 stops the switching control under which the switching elements 51 to 54 are alternately and repeatedly turned on/off. Here, when the gate drive signal GS1 is kept in the on state and the gate drive signal GS2 is kept in the off state, the switching elements 51 and 54 are kept in the on state, and the switching elements 52 and 53 are kept in the off state, so that a positive voltage is continuously applied to the load 4. Further, when the gate drive signal GS1 is kept in the off state and the gate drive signal GS2 is kept in the on state, the switching elements 51 and 54 are kept in the off state, and the switching elements 52 and 53 are kept in the on state, so that a negative voltage is continuously applied to the load 4. Therefore, among the AC power supplied to the load 4, a waveform in which an absolute value of the voltage is higher than E1 [V] (a waveform indicated by a thick solid line at the lowermost stage in FIG. 4) is realized when the variable voltage E2 of the variable voltage power supply 7 is superimposed on the output voltage E1 of the DC power supply 30.

Next, a control procedure will be described at the time of regeneration of the load 4 and at the time of low-voltage input in which the voltage of the DC power input to the multi-stage voltage power supply 3 is less than a predetermined upper-limit charging voltage. In this case, the switching circuit driver 8 inputs the gate drive signals GS1 and GS2, which are generated according to the known inverter control algorithm, to the switching elements 51 to 54 of the switching circuit 5, and turns on/off these switching elements 51 to 54, thereby converting the AC power output from the load 4 into DC power and supplying it from the switching circuit 5 to the power lines 21 and 22. In addition, when the voltage between the power lines 21 and 22 is lower than the predetermined upper-limit charging voltage of the DC power supply 30 which is a secondary battery, the power supply driver 6 turns on the backflow prevention switching element 34 to directly supply the DC power, which is output from the switching circuit 5, to the DC power supply 30, and charges the DC power supply 30.

Next, a control procedure will be described at the time of regeneration of the load 4 and at the time of high-voltage input in which the voltage of the DC power input to the multi-stage voltage power supply 3 is equal to or more than the predetermined upper-limit charging voltage. In this case, the switching circuit driver 8 turns on/off the switching elements 51 to 54 according to the same procedure as that at the time of low-voltage input to convert the AC power output from the load 4 into DC power, and supplies it from the switching circuit 5 to the power lines 21 and 22. Further, when the voltage between the power lines 21 and 22 is equal to or more than the upper-limit charging voltage, the power supply driver 6 turns off the backflow prevention switching element 34, inputs the gate drive signals GP3 and GP4, which are generated according to a known algorithm, to the switching elements 721 to 724 of the secondary-side circuit 72 of the variable voltage power supply 7 such that the DC power of a predetermined charging voltage is output from the pair of primary-side input/output terminals 71p and 71n, and turns on/off these switching elements 721 to 724. Thereby, some of the DC power in the power lines 21 and 22 are transformed by the variable voltage power supply 7, and are supplied to the DC power supply 30.

According to the power supply system 1 of the present embodiment, the following effects are obtained.

(1) The power supply system 1 includes the DC power supply 30, the switching circuit 5 including the plurality of arm switches 51 to 54, which connect the power lines 21 and 22 connected to both electrodes of the DC power supply 30 and the load 4, and the variable voltage power supply 7 that outputs the power of the variable voltage E2 from the pair of secondary-side input/output terminals 72p and 72n. In the present embodiment, both of the pair of secondary-side input/output terminals 72p and 72n of the variable voltage power supply 7 are connected to the positive electrode power line 21, and thus the variable voltage E2 of the variable voltage power supply 7 can be stacked on the DC voltage E1 of the DC power supply 30. Therefore, according to the present embodiment, since it is not necessary to operate the switching circuit 5 in order to change the voltage applied to the load 4 while the variable voltage E2 is superimposed on the DC voltage E1 of the DC power supply 30 (that is, when the high voltage is applied), it is not necessary to increase the number of arm switching elements included in the switching circuit 5 in a case of making the voltage multiple stages. For this reason, it is possible to reduce the number of arm switching elements in the switching circuit 5 as compared with the case of making the voltage multiple stages by the multi-stage DC chopper circuit as disclosed in Patent Document 1, for example, and thus it is possible to reduce switching loss and steady loss to that extent.

Further, according to the present embodiment, as described above, it is not necessary to operate the switching circuit 5 to change the voltage during the high-voltage application, and thus it is not necessary to consider a surge voltage during the high-voltage application in a case of designing the withstand voltage of the arm switching elements 51 to 54 included in the switching circuit 5. Therefore, according to the present embodiment, it is possible to lower the withstand voltage of the arm switching elements 51 to 54 included in the switching circuit 5 as compared with the case of making the voltage multiple stages by the multi-stage DC chopper circuit as disclosed in Patent Document 1, for example, and thus it is possible to reduce steady loss in the arm switching elements 51 to 54 and to further reduce costs of the arm switching elements 51 to 54.

Further, according to the present embodiment, as described above, it is not necessary to operate the switching circuit. 5 to change the voltage during the high-voltage application, and thus a high frequency component of the voltage applied to the load 4 can be reduced, whereby it is also possible to reduce iron loss.

Here, efficiency realized by the power supply system 1 according to the present embodiment will be described while comparing with a power supply system according to the related art.

Figure 5A:
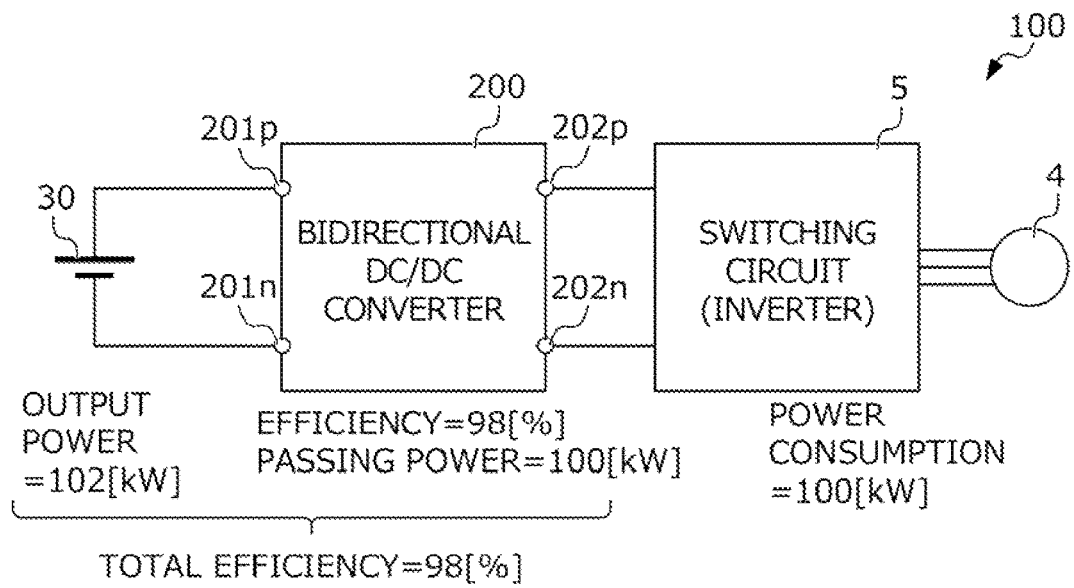
FIG. 5A is a diagram schematically showing a power supply system according to the related art.
Figure 5B:
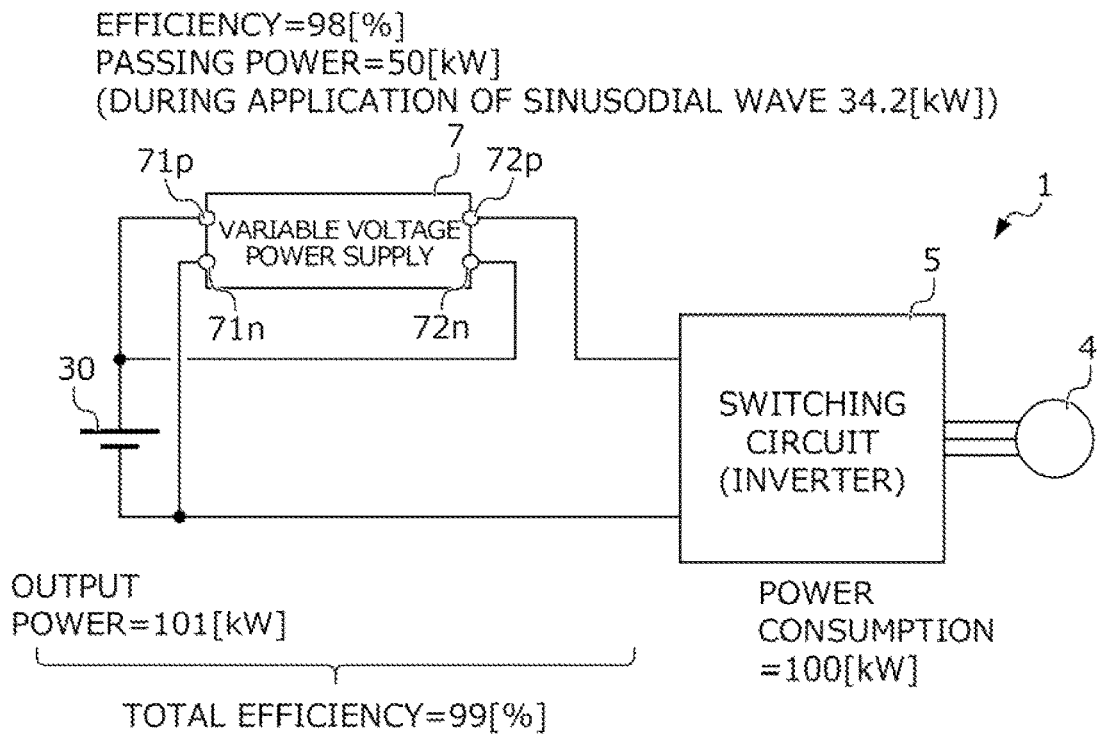
FIG. 5B is a diagram schematically showing the power supply system according to the present embodiment.

FIG. 5A is a diagram schematically showing a power supply system 100 according to the related art, and FIG. 5B is a diagram schematically showing the power supply system 1 according to the present embodiment.

Here, the power supply system 100 according to the related art means a system including a bidirectional DC/DC converter 200 that steps up power output from a DC power supply 30 and supplies the power to a switching circuit 5 and a load 4 as shown in FIG. 5A. In the power supply system 100 according to the related art, unlike the power supply system 1 according to the present embodiment as shown in FIG. 5B, a pair of low voltage-side input/output terminals 201p and 201n of the bidirectional DC/DC converter 200 are connected to both electrodes of the DC power supply 30, and a pair of high voltage-side input/output terminals 202p and 202n of the bidirectional DC/DC converter 200 are connected to both electrodes of the switching circuit 5. In other words, the power supply system 100 according to the related art differs from the power supply system 1 according to the present embodiment in that all the power output from the DC power supply 30 passes through the bidirectional DC/DC converter 200.

Here, in a case of stepping up the voltage of the DC power supply 30 twice and supplying power of 100 [kW] to the switching circuit 5 and the load 4, the efficiency of both the power supply systems 1 and 100 are compared with each other. Further, here, the efficiency is 98[%] in both of the bidirectional DC/DC converter 200 and the efficiency of the variable voltage power supply 7 which is an isolated bidirectional DC/DC converter.

As described above, in the power supply system 100 according to the related art, since all the power output from the DC power supply 30 passes through the bidirectional DC/DC converter 200, the output power of the DC power supply 30 is about 102 [kW]. In other words, the efficiency of the entire system in the power supply system 100 according to the related art is 98[%], which is equal to the efficiency of the bidirectional DC/DC converter 200.

On the other hand, in the power supply system 1 according to the present embodiment, the power supplied to the switching circuit 5 and the load 4 is divided into the power directly output from the DC power supply 30 and the power passing through the variable voltage power supply 7. In other words, unlike the power supply system 100 according to the related art, some of the power output from the DC power supply 30 passes through the variable voltage power supply 7. For this reason, when the voltage of the DC power supply 30 is stepped up twice, the power output directly from the DC power supply 30 and the power passing through the variable voltage power supply 7 are equal to 50 [kW] in the power supplied to the switching circuit 5 and the load 4. For this reason, when the efficiency of the variable voltage power supply 7 is 98 [%], the output power of the DC power supply 30 is about 101 [kW]. Therefore, the efficiency of the entire system in the power supply system 1 according to the present embodiment becomes 99[%] higher than the efficiency of the variable voltage power supply 7. Further, when the sinusoidal AC power is supplied as shown in FIG. 4, the power passing through the variable voltage power supply 7 is further lowered to about 34.2 [kW], and thus the efficiency of the entire system is further increased.

(2) In the present embodiment, the variable voltage power supply 7 includes the DC/DC converter that transforms the power in the pair of primary-side input/output terminals 71$p$ and 71$n$ and outputs the power of the variable voltage E2 from the pair of secondary-side input/output terminals 72$p$ and 72$n$, and the pair of primary-side input/output terminals 71$p$ and 71$n$ of the variable voltage power supply 7 are connected to both electrodes of the DC power supply 30. In other words, in the present embodiment, the variable voltage power supply 7 transforms the power output from the DC power supply 30 and outputs the power of the variable voltage E2. Therefore, according to the present embodiment, it is possible to make the voltage multiple stages by one DC power supply 30.

(3) In the present embodiment, the variable voltage power supply 7 includes the isolated bidirectional DC/DC converter including the insulation transformer 70, the primary-side circuit 71 that connects the primary side of the insulation transformer 70 and the pair of primary-side input/output terminals 71$p$ and 71$n$, and the secondary-side circuit 72 that connects the secondary side of the insulation transformer 70 and the pair of secondary-side input/output terminals 72$p$ and 72$n$, and the DC power supply 30 is the secondary battery that can be charged and discharged. Therefore, according to the present embodiment, when the power output from the load 4 is a low voltage lower than the upper-limit charging voltage of the DC power supply 30, the power output from the load 4 is directly supplied to the DC power supply 30, and when the power output from the load 4 is a high voltage higher than the upper-limit charging voltage of the DC power supply 30, the power output from the load 4 can be stepped down by the variable voltage power supply 7 and supplied to the DC power supply 30.

(4) In the present embodiment, the backflow prevention switching element 34 is provided on the positive electrode power line 21 between the pair of secondary-side input/output terminals 72$p$ and 72$n$ to allow the output power of the DC power supply 30 and cut off the current in the opposite direction to the output current. Therefore, according to the present embodiment, it is possible to prevent the pair of secondary-side input/output terminals 72$p$ and 72$n$ from being short-circuited when the power of the variable voltage E2 is output from the pair of secondary-side input/output terminals 72$p$ and 72$n$ of the variable voltage power supply 7. Further, according to the present embodiment, when the power of the variable voltage E2 is output from the pair of secondary-side input/output terminals 72$p$ and 72$n$ of the variable voltage power supply 7, it is possible to prevent the pair of secondary-side input/output terminals 72$p$ and 72$n$ from being short-circuited as described above, and when the power is output from the load 4, the switching element 34 can be turned on to supply the power, which is output from the load 4, to the DC power supply 30.

(5) The power supply system 1 according to the present embodiment includes the power supply driver 6 that changes the voltage between the pair of secondary-side input/output terminals 72$p$ and 72$n$ from 0 to the predetermined maximum voltage by operating the variable voltage power supply 7. According to the present embodiment, since the waveform of the variable voltage E2 of the power output from the variable voltage power supply 7 can be shaped into a favorable waveform by the power supply driver 6, it is possible to supply the AC power with the favorable waveform without operating the plurality of arm switching elements 51 to 54 while the variable voltage E2 is superimposed.

(7) In the present embodiment, the switching circuit driver 8 executes the switching control to alternately turn on and off the arm switching elements 51 to 54 within the period in which the voltage between the pair of secondary-side input/output terminals 72$p$ and 72$n$ is equal to or less than the predetermined voltage threshold value, and maintains the arm switching elements 51 to 54 in either an on or off state within the period in which the voltage between the pair of secondary-side input/output terminals 72$p$ and 72$n$ is higher than the predetermined voltage threshold value. In other words, in the present embodiment, the switching circuit driver 8 can stop the execution of the switching control during the high-voltage application to further reduce the switching loss and the steady loss in the switching circuit 5.

Second Embodiment

Next, a power supply system according to a second embodiment of the present invention will be described with reference to the drawings. Further, in the following description of the power supply system according to the present embodiment, the same components as those of the power supply system 1 according to the first embodiment are denoted by the same reference numerals, and details thereof will not be described. The power supply system according to the present embodiment differs in a circuit configuration of the variable voltage power supply from that of the first embodiment.

Figure 6:
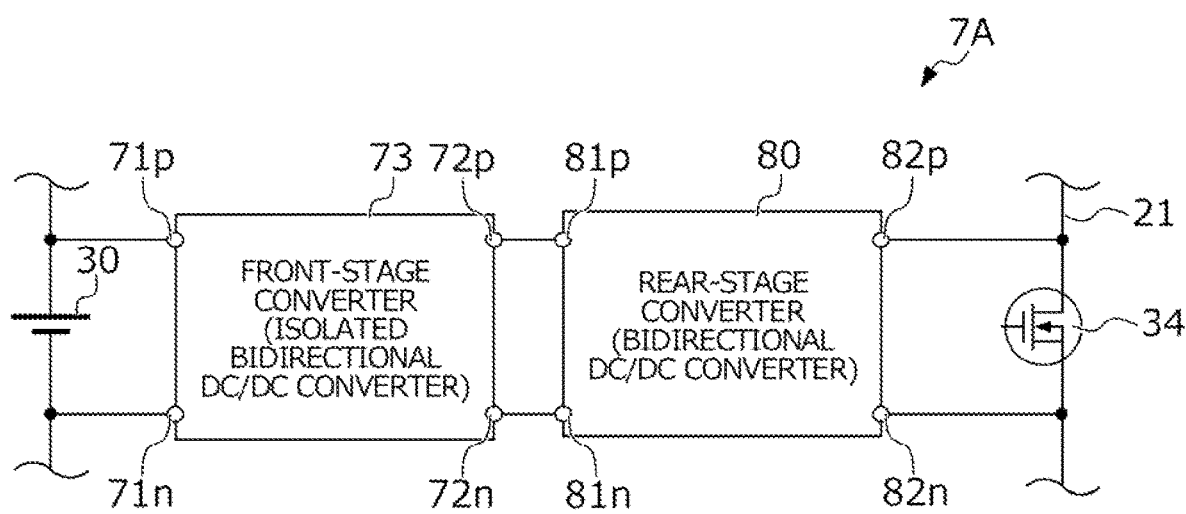
FIG. 6 is a diagram showing a circuit configuration of a variable voltage power supply of a power supply system according to a second embodiment of the present invention.

FIG. 6 is a diagram showing a circuit configuration of a variable voltage power supply 7A of the power supply system according to the present embodiment. The variable voltage power supply 7A includes a front-stage converter 73 and a rear-stage converter 80 which are combined in series in order from the DC power supply 30 to the backflow prevention switching element 34 provided on the positive electrode power line 21.

The front-stage converter 73 is an isolated bidirectional DC/DC converter including an insulation transformer (not shown), a primary-side circuit (not shown) that connects a primary side of the insulation transformer and the pair of primary-side input/output terminals 71$p$ and 71$n$, and a secondary-side circuit (not shown) that connects a secondary side of the insulation transformer and a pair of primary-side input/output terminals 81*p* and 81*n* of the rear-stage converter 80. Further, since the front-stage converter 73 has the same configuration as the variable voltage power supply 7 described with reference to FIG. 2, details thereof will not be described. As in the variable voltage power supply 7 according to the first embodiment, the pair of primary-side input/output terminals 71*p* and 71*n* of the front-stage converter 73 is connected to both the positive and negative electrodes of the DC power supply 30. Further, as in the variable voltage power supply 7 according to the first embodiment, both pair of secondary-side input/output terminals 72*p* and 72*n* of the isolated bidirectional DC/DC converter 73 are connected to both sides of the backflow prevention switching element 34 provided on the positive electrode power line 21, respectively, through the rear-stage converter 80.

The rear-stage converter 80 is a bidirectional DC/DC converter including a pair of primary-side input/output terminals 81*p* and 81*n* connected to the pair of secondary-side input/output terminals 72*p* and 72*n* of the front-stage converter 73 and a pair of secondary-side input/output terminals 82*p* and 82*n* connected to both ends of the backflow prevention switching element 34 provided on the positive electrode power line 21 and capable of stepping up or down the DC power between the pair of primary-side input/output terminals 81*p* and 81*n* and the pair of secondary-side input/output terminals 82*p* and 82*n* to bidirectionally input and output the DC power.

Figure 7A:
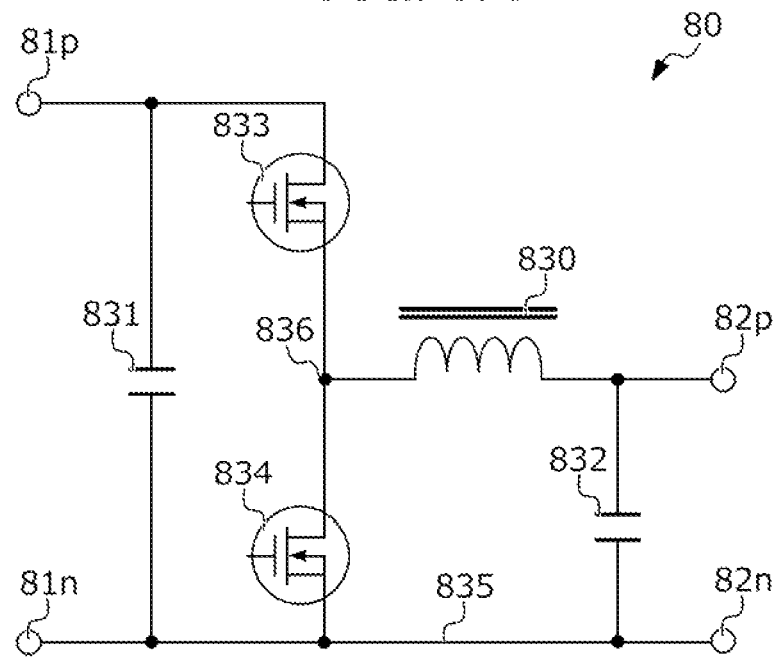
FIG. 7A is a diagram showing a first example of a rear-stage converter.

FIG. 7A is a diagram showing a first example of the rear-stage converter 80. The rear-stage converter 80 shown in FIG. 7A is a step-up/down chopper circuit configured by a combination of: a step-down chopper circuit that steps down the DC power input to the pair of primary-side input/output terminals 81*p* and 81*n* and outputs it to the pair of secondary-side input/output terminals 82*p* and 82*n*; and a step-up chopper circuit that steps up the DC power input to the pair of secondary-side input/output terminals 82*p* and 82*n* and outputs it to the pair of primary-side input/output terminals 81*p* and 81*n*.

The rear-stage converter 80 shown in FIG. 7A includes a reactor 830, a primary-side capacitor 831, a secondary-side capacitor 832, a first switching element 833, a second switching element 834, and a negative bus 835.

The negative bus 835 is a wiring for connecting the primary-side input/output terminal 81*n* and the secondary-side input/output terminal 82*n*. The reactor 830 has one end side connected to the secondary-side input/output terminal 82*p* and the other end side connected to a connection node 836 between the first switching element 833 and the second switching element 834. The primary-side capacitor 831 has one end side connected to the primary-side input/output terminal 81*p* and the other end side connected to the negative bus 835. The secondary-side capacitor 832 has one end side connected to the secondary-side input/output terminal 82*p* and the other end side connected to the negative bus 835. For the switching elements 833 and 834, for example, an N-channel MOSFET is used as in the switching element 711 shown in FIG. 2. A drain of the first switching element 833 is connected to the primary-side input/output terminal 81*p*, and a source of the first switching element 833 is connected to the reactor 830. Further, a drain of the second switching element 834 is connected to the reactor 830, and a source of the second switching element 834 is connected to the negative bus 835.

According to the rear-stage converter 80 shown in FIG. 7A, switching of the switching elements 833 and 834 is controlled by a drive circuit (not shown), whereby the DC power in the pair of primary-side input/output terminals 81*p* and 81*n* can be stepped down to be output from the pair of secondary-side input/output terminals 82*p* and 82*n*, and the DC power in the pair of secondary-side input/output terminals 82*p* and 82*n* can be stepped up to be output from the pair of primary-side input/output terminals 81*p* and 81*n*.

Figure 7B:
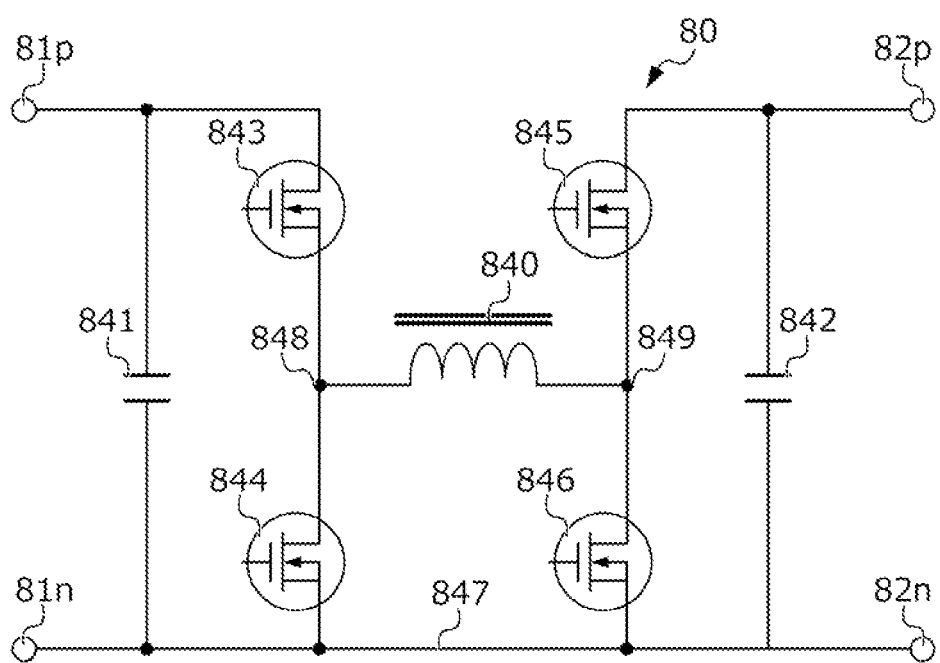
FIG. 7B is a diagram showing a second example of a rear-stage converter.

FIG. 7B is a diagram showing a second example of the rear-stage converter 80. The rear-stage converter 80 shown in FIG. 7B is a buck-boost converter configured by a combination of: a step-up/down chopper circuit that steps up and down the DC power input to the pair of primary-side input/output terminals 81*p* and 81*n* and outputs it to the pair of secondary-side input/output terminals 82*p* and 82*n*; and a step-up/down chopper circuit that steps up and down the DC power input to the pair of secondary-side input/output terminals 82*p* and 82*n* and outputs it to the pair of primary-side input/output terminals 81*p* and 81*n*.

The rear-stage converter 80 shown in FIG. 7B includes a reactor 840, a primary-side capacitor 841, a secondary-side capacitor 842, a first switching element. 843, a second switching element 844, a third switching element 845, a fourth switching element 846, and a negative bus 847.

The negative bus 847 is a wiring for connecting the primary-side input/output terminal 81*n* and the secondary-side input/output terminal 82*n*. The reactor 840 has one end side connected to a connection node 848 between the first switching element 843 and the second switching element 844 and the other end side connected to a connection node 849 between the third switching element 845 and the fourth switching element 846. The primary-side capacitor 841 has one end side connected to the primary-side input/output terminal 81*p* and the other end side connected to the negative bus 847. The secondary-side capacitor 842 has one end side connected to the secondary-side input/output terminal 82*p* and the other end side connected to the negative bus 787. For the switching elements 843 to 846, for example, an N-channel MOSFET is used as in the switching element 711 shown in FIG. 2. A drain of the first switching element 843 is connected to the primary-side input/output terminal 81*p*, and a source of the first switching element 843 is connected to the reactor 840. A drain of the second switching element 844 is connected to the reactor 840, and a source of the second switching element 844 is connected to the negative bus 847. A drain of the third switching element 845 is connected to the secondary-side input/output terminal 82*p*, and a source of the third switching element 845 is connected to the reactor 840. Further, a drain of the fourth switching element 846 is connected to the reactor 840, and a source of the fourth switching element 846 is connected to the negative bus 847.

According to the rear-stage converter 80 shown in FIG. 7B, switching of the switching elements 843 to 846 is controlled by a drive circuit (not shown), whereby the DC power in the pair of primary-side input/output terminals 81*p* and 81*n* can be stepped up and down to be output from the pair of secondary-side input/output terminals 82*p* and 82*n*, and the DC power in the pair of secondary-side input/output terminals 82*p* and 82*n* can be stepped up and down to be output from the pair of primary-side input/output terminals 81*p* and 81*n*.

According to the power supply system of the present embodiment, the following effects can be obtained in addition to the effects of (1) to (7) described above.

(8) In the first embodiment described above, the case has been described in which the isolated bidirectional DC/DC converter shown in FIG. 2 is used as the variable voltage power supply 7 and the pair of secondary-side input/output terminals 72p and 72n are directly connected to the positive electrode power line 21. However, in this case, the control range is limited during regeneration in which the DC power input to the pair of secondary-side input/output terminals 72p and 72n is transformed and is output from the pair of primary-side input/output terminals 71p and 71n. On the other hand, in the present embodiment, the front-stage converter 73 serving as an isolated bidirectional DC/DC converter and the rear-stage converter 80 serving as a bidirectional DC/DC converter are combined to be used as the variable voltage power supply 7A. In other words, in the present embodiment, the front-stage converter 73 is connected to the positive electrode power line 21 through the rear-stage converter 80. Therefore, according to the present embodiment, since the rear-stage converter 80 can be driven and the DC power on the positive electrode power line 21 can be stepped up or stepped down as needed and supplied to the front-stage converter 73 during regeneration, it is possible to make the control range during regeneration equal to the control range during power running.

Third Embodiment

Next, a power supply system according to a third embodiment of the present invention will be described with reference to the drawings. Further, in the following description of the power supply system according to the present embodiment, the same components as those of the power supply system 1 according to the first embodiment are denoted by the same reference numerals, and details thereof will not be described.

Figure 8:
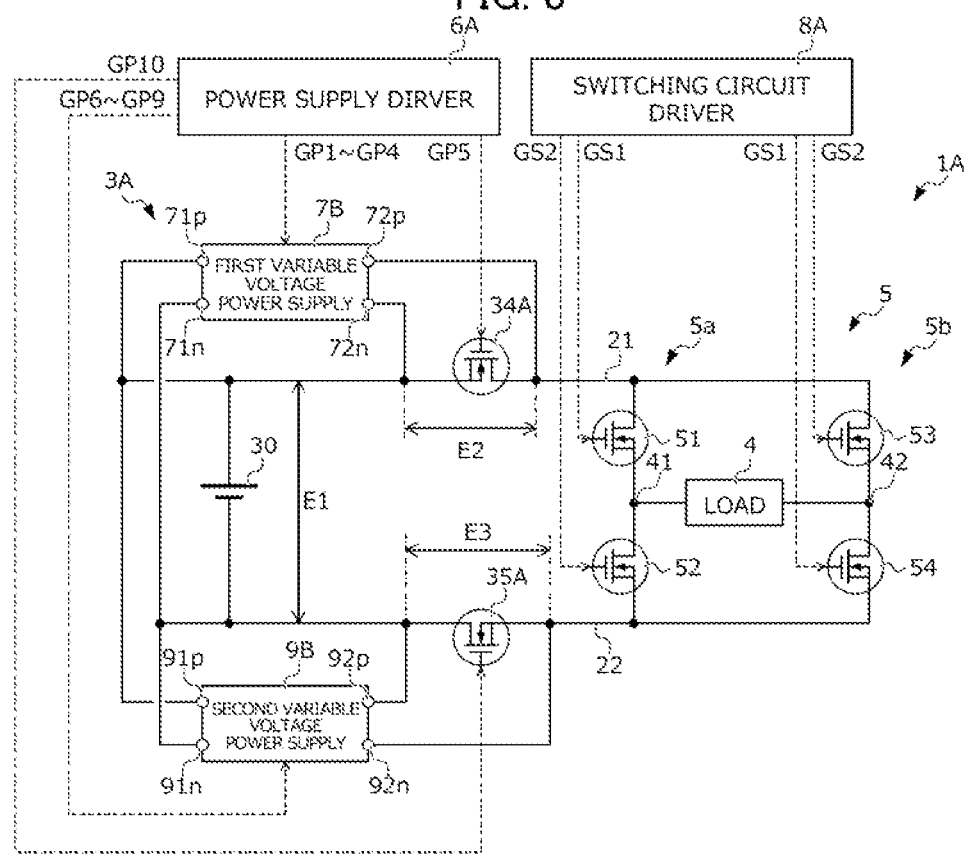
FIG. 8 is a diagram showing a circuit configuration of a power supply system according to a third embodiment of the present invention.

FIG. 8 is a diagram showing a circuit configuration of a power supply system 1A according to the present embodiment. The power supply system 1A according to the present embodiment differs from that of the first embodiment in terms of configurations of a multi-stage voltage power supply 3A, a power supply driver 6A, and a switching circuit driver 8A.

The multi-stage voltage power supply 3A includes a DC power supply 30 that outputs DC power, a first variable voltage power supply 7B that outputs DC power of a variable voltage that fluctuates in a predetermined cycle, a second variable voltage power supply 9B that outputs DC power of a variable voltage that fluctuates in a predetermined cycle, a first backflow prevention switching element 34A, and a second backflow prevention switching element 35A. The multi-stage voltage power supply 3A is a four-level DC voltage power supply that can output DC voltages of four stages of 0 [V], E1 [V], E1+E2 [V] (hereinafter, a variable voltage output from the first variable voltage power supply 7B being referred to as E2), and E1+E2+E3 [V] (hereinafter, a variable voltage output from the second variable voltage power supply 9B being referred to as E3), according to a circuit configuration to be described below.

Since the first variable voltage power supply 7B and the first backflow prevention switching element 34A have the same configuration as the variable voltage power supply 7 and the backflow prevention switching element 34 in the power supply system 1 according to the first embodiment, details thereof will not be described.

The second variable voltage power supply 9B includes, for example, a pair of primary-side input/output terminals 91p and 91n and a pair of secondary-side input/output terminals 92p and 92n that are isolated from each other, and an isolated bidirectional DC/DC converter is used that can bidirectionally input and output DC power between the pair of primary-side input/output terminals 91p and 91n and the pair of secondary-side input/output terminals 92p and 92n. In other words, during power running of the load 4, the second variable voltage power supply 9B transforms the DC power in the pair of primary-side input/output terminals 91p and 91n and outputs the power of the variable voltage E3 from the pair of secondary-side input/output terminals 92p and 92n, and during regeneration of the load 4, the second variable voltage power supply 9B transforms the DC power in the pair of secondary-side input/output terminals 92p and 92n and outputs the DC power from the pair of primary-side input/output terminals 91p and 91n.

As shown in FIG. 8, both of the pair of secondary-side input/output terminals 92p and 92n of the second variable voltage power supply 9B are connected to the negative electrode power line 22 between the DC power supply 30 and the switching circuit 5. More specifically, the secondary-side positive electrode input/output terminal 92p of the second variable voltage power supply 9B is connected to the negative electrode power line 22 on a high-potential side as compared with the secondary-side negative electrode input/output terminal 92n (that is, on a side closer to the DC power supply 30 as compared with the secondary-side negative electrode input/output terminal 92n). In the present embodiment, the case has been described in which both of the pair of secondary-side input/output terminals 92p and 92n are connected to the negative electrode power line 22, but the present invention is not limited thereto. Both of the pair of secondary-side input/output terminals 92p and 92n of the variable voltage power supply 9B may be connected to the positive electrode power line 21 between the DC power supply 30 and the switching circuit 5.

The second backflow prevention switching element 35A is provided on the negative electrode power line 22 between the pair of secondary-side input/output terminals 92p and 92n. The switching element 35A is switched on or off according to on/off of a gate drive signal GP10 input from the power supply driver 6A. In the present embodiment, a case will be described in which an N-channel MOSFET including a body diode, which has a withstand voltage performance similar to that of the switching elements 51 to 54 and allows a current from a source to a drain, is used as the switching element 35A, but the present invention is not limited thereto. As the switching element 35A, a known switching element such as an IGBT or a JFET may be used in addition to the MOSFET.

The drain of the switching element 35A is connected to the secondary-side positive electrode input/output terminal 92p, and the source of the switching element 35A is connected to the secondary-side negative electrode input/output terminal 92n. For this reason, the body diode of the switching element 35A acts as a backflow prevention diode that allows an output current of the DC power supply 30 (a current flowing to the DC power supply 30 from the switching circuit 5 through the negative electrode power line 22) and cuts off a reverse current in an opposite direction to the output current. Further, the switching element 35A is switched on or off according to on/off of a gate drive signal GP10, and thus the switching element 35A can act as a switch for interrupting a bypass line bypassing the backflow prevention diode.

Further, as shown in FIG. 8, the pair of primary-side input/output terminals 91p and 91n of the second variable voltage power supply 9B are connected to both positive and negative electrodes of the DC power supply 30. More specifically, the primary-side positive electrode input/output terminal 91p of the second variable voltage power supply 9B is connected to the positive electrode of the DC power supply 30, and the primary-side negative electrode input/output terminal 91*n* of the second variable voltage power supply 9B is connected to the negative electrode of the DC power supply 30. In the present embodiment, the case has been described in which the pair of primary-side input/output terminals 91*p* and 91*n* are connected to both the positive and negative electrodes of the DC power supply 30, but the present invention is not limited thereto. The pair of primary-side input/output terminals 91*p* and 91*n* of the second variable voltage power supply 9B may be connected to both positive and negative electrodes of a DC power supply different from the DC power supply 30.

Further, a specific circuit configuration of the second variable voltage power supply 9B is the same as that of the variable voltage power supply 7 described with reference to FIG. 2, and thus detailed illustration and description thereof will not be given. In other words, the switching element of the primary-side circuit of the second variable voltage power supply 9B is switched on or off according to on/off of gate drive signals GP6 and GP7 input from the power supply driver 6A, and the switching element of the secondary-side circuit of the second variable voltage power supply 9B is switched on or off according to on/off of gate drive signals GP8 and GP9 input from the power supply driver 6A.

According to the multi-stage voltage power supply 3A including the two variable voltage power supplies 7B and 9B as described above, it is possible to output DC voltages of four stages of 0 [V], E1 [V], E1+E2 [V], and E1+E2+E3 [V].

Here, control procedures of the power supply system 1A during power running of the load 4 will be described separately for during low-voltage output in which the voltage of the DC power output from the multi-stage voltage power supply 3A is less than E1 [V], during medium-voltage output in which the voltage is less than E1+E2 [V], and during high-voltage output in which the voltage is equal to or more than E1+E2 [V], respectively.

First, since the control procedure of the power supply driver 6A and the switching circuit driver 8A at the time of power running of the load 4 and at the time of low-voltage output is the same as that of the power supply system 1 according to the first embodiment, details thereof will not be described.

Next, the control procedure of the power supply driver 6A and the switching circuit driver 8A at the time of power running of the load 4 and at the time of medium-voltage output is the same as that of the power supply system 1 according to the first embodiment. In other words, the power supply driver 6A generates the gate drive signals GP1 and GP2 according to the procedure described with reference to FIG. 3 such that the waveform of the variable voltage E2 between the pair of secondary-side input/output terminals 72*p* and 72*n* becomes equal to the waveform of the portion of the final output waveform whose amplitude exceeds the output voltage E1 of the DC power supply 30, and operates the primary-side circuit 71 of the variable voltage power supply 7 by these gate drive signals GP1 and GP2. Further, the power supply driver 6A turns off the gate drive signal GP5 during power running of the load 4, and thus turns off the backflow prevention switching element 34A. Further, at the time of medium-voltage output, the power supply driver 6A turns off all the gate drive signals GP6 to GP10 in order to maintain the variable voltage E3 between the pair of secondary-side input/output terminals 92*p* and 92*n* at 0 [V]. Thereby, the power lines 21 and 22 are supplied with the power obtained by superimposing the DC power of the variable voltage E2 output from the first variable voltage power supply 7B on the DC power of the voltage E1 output from the DC power supply 30.

Further, at the time of medium-voltage output, as in the power supply system 1 according to the first embodiment, the switching circuit driver 8A alternately and repeatedly executes on/off switching control of these switching elements 51 to 54 of the switching circuit 5 within a period in which the variable voltage E2 between the pair of secondary-side input/output terminals 72*p* and 72*n* is equal to or less than a predetermined voltage threshold value, in other words, within a period in which the output power of the variable voltage power supply 7B is not superimposed on the power lines 21 and 22. Further, the switching circuit driver 8A maintains the switching elements 51 to 54 in either an on or off state within a period in which the variable voltage E2 between the pair of secondary-side input/output terminals 72*p* and 72*n* is higher than a predetermined voltage threshold value, in other words, within a period in which the output power of the variable voltage power supply 7B is superimposed on the power lines 21 and 22.

Next, a description will be given with respect to a control procedure of the power supply driver 6A and the switching circuit driver 8A at the time of power running of the load 4 and at the time of high-voltage output. In this case, the power supply driver 6A generates the gate drive signals GP1 and GP2 according to the procedure described with reference to FIG. 3 such that the waveform of the variable voltage E2 between the pair of secondary-side input/output terminals 72*p* and 72*n* of the first variable voltage power supply 7B becomes equal to the waveform of the portion of the final output waveform whose amplitude is from E1 to the sum of the output voltage E1 of the DC power supply 30 and the maximum voltage E2_max of the first variable voltage power supply 7B, and operates the primary-side circuit 71 of the first variable voltage power supply 7B by these gate drive signals GP1 and GP2. Further, the power supply driver 6A generates the gate drive signals GP6 and GP7 according to the procedure described with reference to FIG. 3 such that the waveform of the variable voltage E3 between the pair of secondary-side input/output terminals 92*p* and 92*n* of the second variable voltage power supply 9B becomes equal to the waveform of the portion of the final output waveform whose amplitude exceeds E1+E2_max, and operates the primary-side circuit of the second variable voltage power supply 9B by these gate drive signals GP6 and GP7. Further, the power supply driver 6A turns off the gate drive signals GP5 and GP10 during power running of the load 4, and thus turns off the backflow prevention switching elements 34A and 35A. Thereby, the power lines 21 and 22 is supplied with the power in which the DC power of the variable voltage E2 output from the first variable voltage power supply 7B and the DC power of the variable voltage E3 output from the second variable voltage power supply 9B are superimposed on the DC power of the voltage E1 output from the DC power supply 30.

Further, at the time of high-voltage output, as in the case of the medium-voltage output, the switching circuit driver 8A alternately and repeatedly executes on/off switching control of the switching elements 51 to 54 of the switching circuit 5 within a period in which the output power of both of the first variable voltage power supply 7B and the second variable voltage power supply 9B are not superimposed on the power lines 21 and 22, and the switching circuit driver 8A maintains the switching elements 51 to 54 in either an on or off state within a period in which the output power of at least either one of the first variable voltage power supply 7B and the second variable voltage power supply 9B is superimposed on the power lines 21 and 22.

According to the power supply system 1A of the present embodiment, the following effects are obtained in addition to the effects of (1) to (7) described above.

(9) In the present embodiment, the pair of secondary-side input/output terminals 92*p* and 92*n* of the second variable voltage power supply 9B that outputs the power of the variable voltage E3 are connected to the negative electrode power line 22. Thereby, it is possible to further increase the number of stages of the voltage without increasing the number of arm switching elements 51 to 54 in the switching circuit 5.

In the present embodiment, the case has been described in which the isolated bidirectional DC/DC converter described with reference to FIG. 2 is used as the first variable voltage power supply 7 and the second variable voltage power supply 9B, but the present invention is not limited thereto. As described in the second embodiment, the front-stage converter 73 serving as an isolated bidirectional DC/DC converter and the rear-stage converter 80 serving as a bidirectional DC/DC converter may be used as the first variable voltage power supply and the second variable voltage power supply by a combination in series.

Fourth Embodiment

Next, referring to the drawings, a description will be made with respect to a power supply system according to a fourth embodiment of the present invention and a vehicle as a moving body in which the power supply system is equipped.

Figure 9:
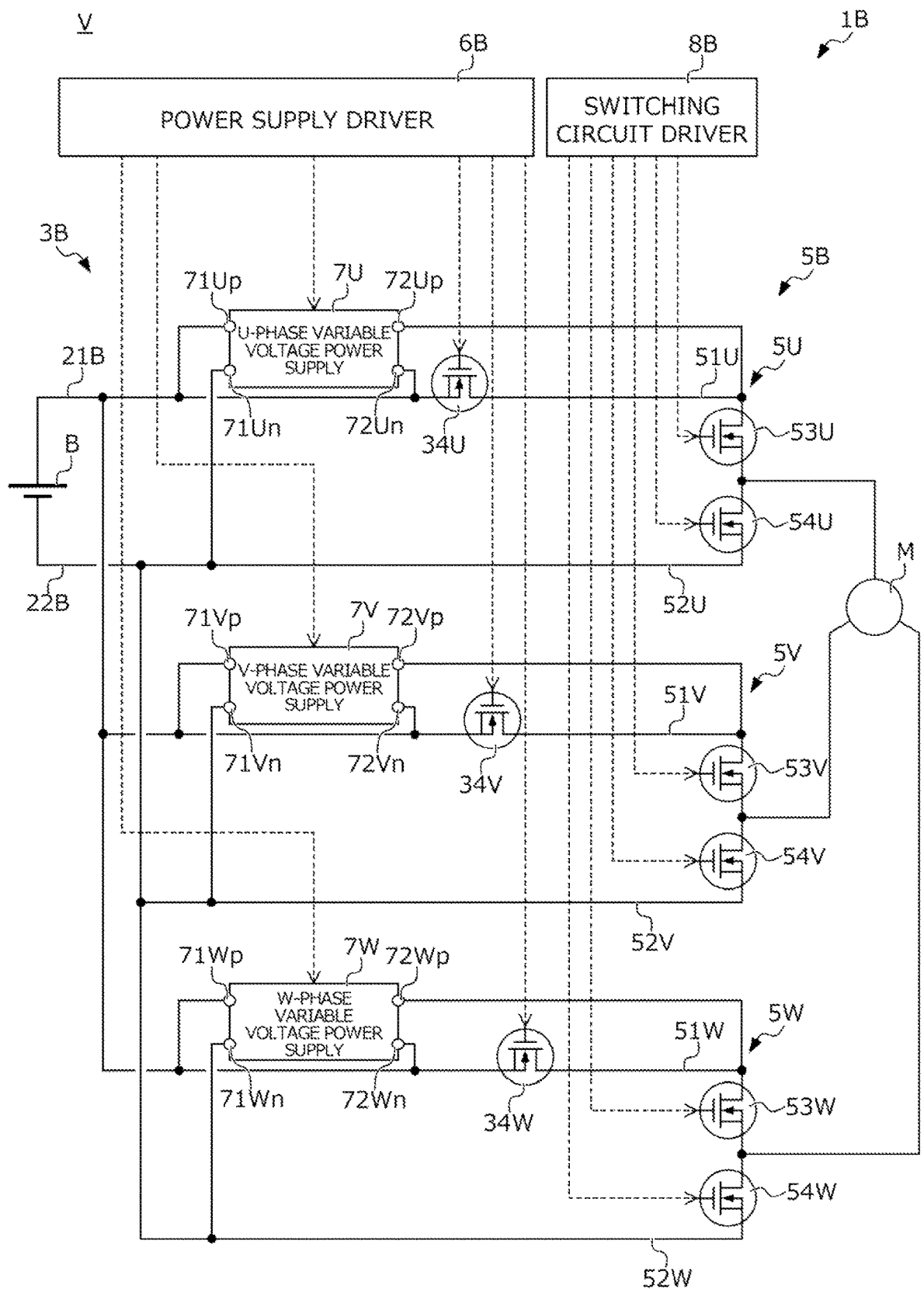
FIG. 9 is a diagram showing a circuit configuration of a power supply system according to a fourth embodiment of the present invention and a vehicle in which the power supply system is equipped.

FIG. 9 is a diagram showing a circuit configuration of a power supply system 1B according to the present embodiment and a vehicle V in which the power supply system 18 is equipped.

The vehicle V includes an AC rotating electrical machine M coupled to a drive wheel (not shown) and a power supply system 18 for the vehicle that transfers power between the AC rotating electrical machine M and a battery B to be described below. In the present embodiment, a case will be mainly described in which the vehicle V accelerates and decelerates by the power generated by the AC rotating electrical machine M, but the present invention is not limited thereto. The vehicle V may be a so-called hybrid vehicle equipped with the AC rotating electrical machine M and an engine as a power generation source.

The AC rotating electrical machine M is coupled to the drive wheels through a power transmission mechanism (not shown). When three-phase AC power is supplied from the power supply system 1B to the AC rotating electrical machine M, drive torque generated by the AC rotating electrical machine M is transmitted to the drive wheels through the power transmission mechanism (not shown) to rotate the drive wheels and to make the vehicle V run. Further, the AC rotating electrical machine M exerts a function of a generator during deceleration of the vehicle V, generates regenerative power, and applies regenerative braking torque according to a magnitude of the regenerative power to the drive wheels. The regenerative power generated by the AC rotating electrical machine M is appropriately charged in the battery B of the power supply system 1B.

The power supply system 1B includes a multi-stage voltage power supply 3B that outputs DC power of a multi-stage voltage to a positive electrode power line 21B and a negative electrode power line 22B, a switching circuit 5B in which the power lines 21B and 22B are connected to the AC rotating electrical machine M, a power supply driver 6B that operates the multi-stage voltage power supply 3B, and a switching circuit driver 8B that operates the switching circuit 5B. The power supply system 1B operates the multi-stage voltage power supply 3B and the switching circuit 5B by the drivers 6B and 8B, thereby converting the DC power output from the multi-stage voltage power supply 3B to the power lines 21B and 22B into three-phase AC to supply it the AC rotating electrical machine M, or converting the three-phase AC power output from the AC rotating electrical machine M into DC to supply it to the multi-stage voltage power supply 3B.

The switching circuit 5B includes three legs 5U, 5V, and 5W that connects the positive electrode power line 21B and the negative electrode power line 22B.

The U-phase leg 5U includes a first U-phase power line 51U that connects the positive electrode power line 21B and an U-phase of the AC rotating electrical machine M, a second U-phase power line 52U that connects the negative electrode power line 22B and the U-phase of the AC rotating electrical machine M, an U-phase upper arm switching element 53U provided on the first U-phase power line 51U, and an U-phase lower arm switching element 54U provided on the second U-phase power line 521U.

The V-phase leg 5V includes a first V-phase power line 51V that connects the positive electrode power line 21B and a V-phase of the AC rotating electrical machine M, a second V-phase power line 52V that connects the negative electrode power line 22B and the V-phase of the AC rotating electrical machine M, a V-phase upper arm switching element 53V provided on the first V-phase power line 51V, and a V-phase lower arm switching element 54V provided on the second V-phase power line 52V.

The W-phase leg 5W includes a first W-phase power line 51W that connects the positive electrode power line 21B and a W-phase of the AC rotating electrical machine M, a second W-phase power line 52W that connects the negative electrode power line 22B and the W-phase of the AC rotating electrical machine M, a W-phase upper arm switching element 53W provided on the first W-phase power line 51W, and a W-phase lower arm switching element 54W provided on the second W-phase power line 52W.

These switching elements 53U, 54U, 53V, 54V, 53W, and 54W are switched on or off according to on/off of a gate drive signals input from the switching circuit driver 8B.

The multi-stage voltage power supply 3B includes a battery B as a DC power supply that outputs DC power, each of a U-phase variable voltage power supply 7U, a V-phase variable voltage power supply 7V, and a W-phase variable voltage power supply 7W that outputs DC power of a variable voltage that fluctuates in a predetermined cycle, a U-phase backflow prevention switching element 34U, a V-phase backflow prevention switching element 34V, and a W-phase backflow prevention switching element 34W. The multi-stage voltage power supply 3B is a three-level DC voltage power supply that can output DC voltages of three stages of 0 [V], E1 [V] (hereinafter, an output voltage of the battery B being referred to as E1), and E1+E2 [V] (hereinafter, a variable voltage output from the variable voltage power supplies 7U, 7V, and 7W being referred to as E2), according to a circuit configuration to be described below.

A positive electrode of the battery B is connected to the positive electrode power line 21B, and a negative electrode of the battery B is connected to the negative electrode power line 22B.

As the variable voltage power supplies 7U, 7V, and 7W of respective phases, an isolated bidirectional DC/DC converter is used that can bidirectionally input and output DC power between the pair of primary-side input/output terminals and the pair of secondary-side input/output terminals, as in the variable voltage power supply 7 according to the first embodiment.

More specifically, a pair of secondary-side input/output terminals 72Up and 72Un of the U-phase variable voltage power supply 7U are both connected to the first U-phase power line 51U between the battery B and the U-phase upper arm switching element 53U. More specifically, the secondary-side positive electrode input/output terminal 72Up of the U-phase variable voltage power supply 7U is connected to the first U-phase power line 51U on a high-potential side as compared with the secondary-side negative electrode input/output terminal 72Un (that is, on a side closer to the U-phase upper arm switching element 53U as compared with the secondary-side negative electrode input/output terminal 72Un).

Further, a pair of secondary-side input/output terminals 72Vp and 72Vn of the V-phase variable voltage power supply 7V are both connected to the first U-phase power line 51V between the battery B and the V-phase upper arm switching element 53V. More specifically, the secondary-side positive electrode input/output terminal 72Vp of the V-phase variable voltage power supply 7V is connected to the first V-phase power line 51V on a high-potential side as compared with the secondary-side negative electrode input/output terminal 72Vn (that is, on a side closer to the V-phase upper arm switching element 53V as compared with the secondary-side negative electrode input/output terminal 72Vn).

Further, a pair of secondary-side input/output terminals 72Wp and 72Wn of the W-phase variable voltage power supply 7W are both connected to the first W-phase power line 51W between the battery B and the W-phase upper arm switching element 53W. More specifically, the secondary-side positive electrode input/output terminal 72Wp of the W-phase variable voltage power supply 7W is connected to the first W-phase power line 51W on a high-potential side as compared with the secondary-side negative electrode input/output terminal 72Wn (that is, on a side closer to the W-phase upper arm switching element 53W as compared with the secondary-side negative electrode input/output terminal 72Wn).

In the present embodiment as described above, the case has been described in which both of the pair of secondary-side input/output terminals of the variable voltage power supplies 7U, 7V, and 7W of the respective phases are connected to the power lines 51U, 51V, and 51W of the respective phases on the high-potential side, respectively, but the present invention is not limited thereto. Both of the pair of secondary-side input/output terminals of the variable voltage power supplies 7U, 7V, and 7W of the respective phases may be connected to the power lines 52U, 52V, and 52W of the respective phases on a low-potential side In addition, the backflow prevention switching elements 34U, 34V, and 34W of the respective phases are provided on the power lines 51U, 51V, and 51W of the respective phases between the pair of secondary-side input/output terminals 72Up and 72Un, between the pair of secondary-side input/output terminals 72Vp and 72Vn, and between the pair of secondary-side input/output terminals 72Wp and 72Wn, respectively.

Further, both of the positive and negative electrodes of the battery B are connected to the pair of primary-side input/output terminals 71Up and 71Un of the U-phase variable voltage power supply 7U, the pair of primary-side input/output terminals 71Vp and 71Vn of the V-phase variable voltage power supply 7V, and the pair of primary-side input/output terminals 71Wp and 71Wn of the W-phase variable voltage power supply 7W. More specifically, the primary-side positive electrode input/output terminal 71Up of the U-phase variable voltage power supply 7U is connected to the positive electrode of the battery B, the primary-side negative electrode input/output terminal 71Un of the U-phase variable voltage power supply 7U is connected to the negative electrode of the battery B, the primary-side positive electrode input/output terminal 71Vp of the V-phase variable voltage power supply 7V is connected to the positive electrode of the battery B, the primary-side negative electrode input/output terminal 71Vn of the V-phase variable voltage power supply 7V is connected to the negative electrode of the battery B, the primary-side positive electrode input/output terminal 71Wp of the W-phase variable voltage power supply 7W is connected to the positive electrode of the battery B, and the primary-side negative electrode input/output terminal 71Wn of the W-phase variable voltage power supply 7W is connected to the negative electrode of the battery B. In the present embodiment, the case has been described in which the pair of primary-side input/output terminals of the respective phases are connected to both of the positive and negative electrodes of the battery B, but the present invention is not limited thereto. Both of the pair of primary-side input/output terminals of the respective phases may be connected to both of the positive and negative electrodes of the DC power supply different from the battery B.

Further, since the specific circuit configuration of the variable voltage power supplies 7U, 7V, and 7W of the respective phases is the same as that of the variable voltage power supply 7 described with reference to FIG. 2, and detailed illustration and description will not be given. According to the multi-stage voltage power supply 3B including the variable voltage power supplies 7U, 7V, and 7W of the respective phases as described above, it is possible to output DC voltages of three stages of 0 [V], E1 [V], and E1+E2 [V].

In addition, the control procedure of the power supply driver 6B and the switching circuit driver 8B during power running and during regeneration in the AC rotating electrical machine M is almost the same as that of the power supply system 1 according to the first embodiment, and thus details thereof will not be described.

According to the power supply system 1B of the present embodiment and the vehicle V equipped with the power supply system 1B, the following effects can be obtained in addition to the effects of (1) to (7) described above.

(10) The vehicle V according to the present embodiment includes the AC rotating electrical machine M, the battery B, the U-phase variable voltage power supply 7U, the V-phase variable voltage power supply 7V, the W-phase variable voltage power supply 7W, the U-phase power lines 51U and 52U, the V-phase power lines 51V and 52V, and the W-phase power lines 51W and 52W. In the present embodiment, the pair of secondary-side input/output terminals 72Up and 72Un of the U-phase variable voltage power supply 7U are connected to the first U-phase power line 51U, the pair of secondary-side input/output terminals 72Vp and 72Vn of the V-phase variable voltage power supply 7V are connected to the first V-phase power line 51V, and the pair of secondary-side input/output terminals 72Wp and 72Wn of the W-phase variable voltage power supply 7W are connected to the first W-phase power line 51U. According to the present embodiment, as in the power supply system 1 according to the first embodiment, since it is not necessary to increase the number of arm switching elements included in the legs of the respective phases when the voltage is increased in multiple stages, the switching loss and the steady loss in the legs of the respective phases can be reduced accordingly. Further, according to the present embodiment, as in the power supply system 1 according to the first embodiment, since the withstand voltage of the switching elements included in the legs of the respective phases can be lowered, the steady loss in the switches can be lowered, and the costs of the switches can also be reduced. Further, according to the present embodiment, as in the power supply system 1 according to the first embodiment, since it is not necessary to operate the arm switching elements included in the legs 5U, 5V, and 5W of the respective phases in order to change the voltage during the high-voltage application, the high frequency component of the voltage applied to the AC rotating electrical machine can be reduced, whereby the iron loss can also be reduced.

In the present embodiment, the case has been described in which the isolated bidirectional DC/DC converter described with reference to FIG. 2 is used as the variable voltage power supply 7U, 7V, or 7W, the present invention is not limited thereto. As described in the second embodiment, the front-stage converter 73 serving as an isolated bidirectional DC/DC converter and the rear-stage converter 80 serving as a bidirectional DC/DC converter may be used as the variable voltage power supply 7U, 7V, or 7W by a combination in series.

Although the embodiments of the present invention have been described above, the present invention is not limited thereto. Within the scope of the present invention, the detailed configuration may be changed as appropriate.

For example, in the above-described embodiments, the case has been described in which the full bridge isolated bidirectional DC/DC converter shown in FIG. 2 is used as the variable voltage power supply 7, 7B, 9B, 7U, 7V, or 7W and the front-stage converter 73, but the present invention is not limited thereto.

Figure 10:
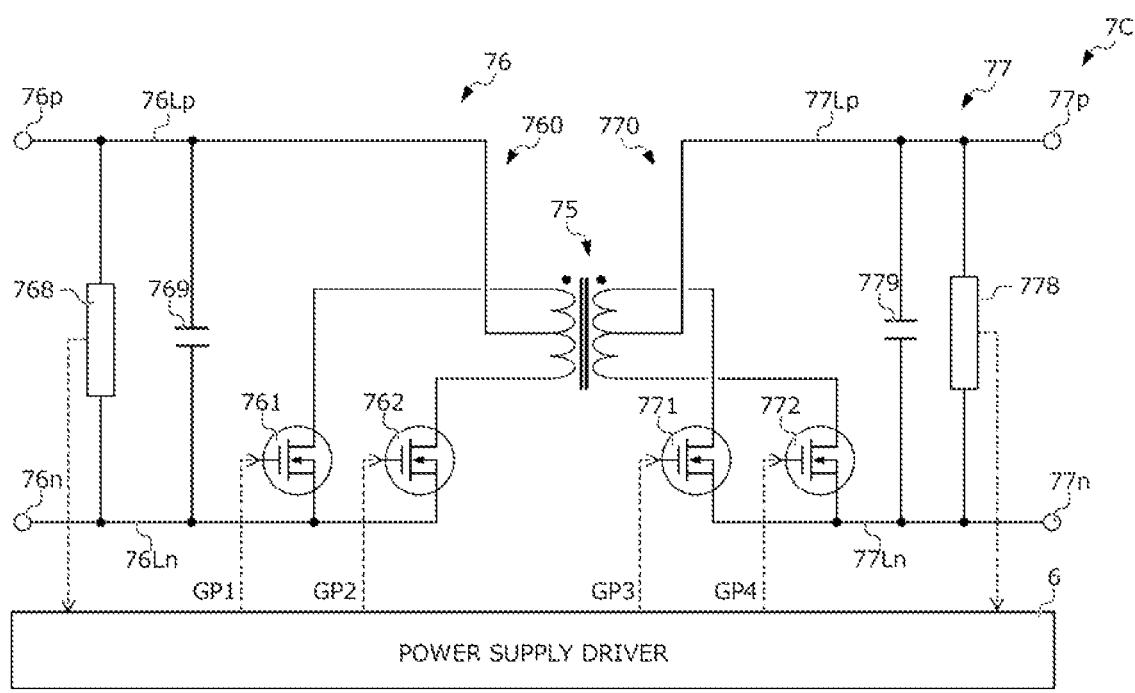
FIG. 10 is a diagram showing another example of a circuit configuration of the variable voltage power supply.

FIG. 10 is a diagram showing another example of the circuit configuration of the variable voltage power supply. FIG. 10 shows a case where a variable voltage power supply 7C is a so-called push-pull isolated bidirectional DC/DC converter.

The variable voltage power supply 7C includes an insulation transformer 75 having a primary coil and a secondary coil, a primary-side circuit 76 in which a primary side of the insulation transformer 75 is connected to a pair of primary-side input/output terminals 76p and 76n, and a secondary-side circuit 77 in which a secondary side of the insulation transformer 75 is connected to a pair of secondary-side input/output terminals 77p and 77n. As shown in FIG. 10, the insulation transformer 75 of the variable voltage power supply 7C is different from the insulation transformer 70 of the variable voltage power supply 7 shown in FIG. 2 in that both of the primary coil and the secondary coil are a center tap type.

The primary-side circuit 76 includes a positive electrode power line 76Lp that connects the primary-side positive electrode input/output terminal 76p and a center tap of the primary coil of the insulation transformer 75, a negative electrode power line 76Ln connected to the primary-side negative electrode input/output terminal 76n, a primary-side synchronous full-wave rectifier circuit 760 that connects these power lines 76Lp and 76Ln and the primary coil of the insulation transformer 75, and a primary-side voltage sensor 768 and a smoothing capacitor 769 that are connected to each other in parallel between the positive electrode power line 76Lp and the negative electrode power line 76Ln.

The primary-side synchronous full-wave rectifier circuit 760 includes a first switching element 761 that connects one end side of the primary coil of the insulation transformer 75 and the negative electrode power line 76Ln, and a second switching element 762 that connects the other end side of the primary coil of the insulation transformer 75 and the negative electrode power line 76Ln. Each of these switching elements 761 and 762 is switched on or off according to on/off of the gate drive signals GP1 and GP2 input from the power supply driver 6. In the example shown in FIG. 10, the case has been described in which an N-channel MOSFET including a body diode, which allows a current from a source to a drain, is used as these switching elements 761 and 762, but the present invention is not limited thereto. As these switching elements 761 and 762, a known switching element such as an IGBT or a JFET may be used in addition to the MOSFET.

Drains of the switching elements 761 and 762 are connected to both ends of the primary coil of the insulation transformer 75, respectively, and sources of the switching elements 761 and 762 are connected to the negative electrode power line 76Ln.

The secondary-side circuit 77 includes a positive electrode power line 77Lp that connects the secondary-side positive electrode input/output terminal 77p and a center tap of the secondary coil of the insulation transformer 75, a negative electrode power line 77Ln connected to the secondary-side negative electrode input/output terminal 77n, a secondary-side synchronous full-wave rectifier circuit 770 that connects these power lines 77Lp and 77Ln and the secondary coil of the insulation transformer 75, and a secondary-side voltage sensor 778 and a smoothing capacitor 779 that are connected to each other in parallel between the positive electrode power line 77Lp and the negative electrode power line 77Ln.

The secondary-side synchronous full-wave rectifier circuit 770 includes a first switching element 771 that connects one end side of the secondary coil of the insulation transformer 75 and the negative electrode power line 77Ln, and a second switching element 772 that connects the other end side of the secondary coil of the insulation transformer 75 and the negative electrode power line 77Ln. Each of these switching elements 771 and 772 is switched on or off according to on/off of the gate drive signals GP3 and GP2 input from the power supply driver 6. In the example shown in FIG. 10, the case has been described in which an N-channel MOSFET including a body diode, which allows a current from a source to a drain, is used as these switching elements 771 and 772, but the present invention is not limited thereto. As these switching elements 771 and 772, a known switching element such as an IGBT or a JFET may be used in addition to the MOSFET.

Drains of the switching elements 771 and 772 are connected to both ends of the primary coil of the insulation transformer 75, respectively, and sources of the switching elements 771 and 772 are connected to the negative electrode power line 77Ln.

What is claimed is:
1. A power supply system comprising:
  a main DC power supply that outputs DC power;
  a first variable voltage power supply that transforms power in a pair of second terminals connected to both electrodes of the main DC power supply or a DC power supply different from the main DC power supply, and outputs power of a variable voltage from a pair of first terminals;

a first power line and a second power line that are connected to both electrodes of the main DC power supply, respectively; and a switching circuit including a plurality of arm switches that connect the first and second power lines and a load, wherein the pair of first terminals are both connected to the first power line, and in the pair of first terminals and the pair of second terminals are insulated.

2. The power supply system according to claim 1, wherein the first variable voltage power supply includes a DC/DC converter that transforms power in a pair of second terminals and outputs the power from the pair of first terminals, and the pair of second terminals are connected to both electrodes of the main DC power supply, respectively.

3. The power supply system according to claim 2, wherein the first variable voltage power supply includes an isolated bidirectional DC/DC converter including an insulation transformer, a primary-side circuit that connects a primary side of the insulation transformer and the pair of second terminals, and a secondary-side circuit that connects a secondary side of the insulation transformer and the pair of first terminals, and the main DC power supply is a secondary battery capable of performing both of discharging during which chemical energy is converted into electric energy and charging during which electric energy is converted into chemical energy.

4. The power supply system according to claim 2, wherein the first variable voltage power supply includes a front-stage converter and a rear-stage converter, the front-stage converter is an isolated bidirectional DC/DC converter including an insulation transformer, a primary-side circuit that connects a primary side of the insulation transformer and the pair of second terminals, and a secondary-side circuit that connects a secondary side of the insulation transformer and a pair of primary-side input/output terminals of the rear-stage converter, the rear-stage converter is a bidirectional DC/DC converter capable of stepping up or down DC power between the pair of primary-side input/output terminals and the pair of second terminals to bidirectionally input and output the DC power, and the main DC power supply is a secondary battery capable of performing both of discharging during which chemical energy is converted into electric energy and charging during which electric energy is converted into chemical energy.

5. The power supply system according to claim 1, wherein a backflow prevention diode is provided on the first power line between the pair of first terminals to allow an output current of the main DC power supply and cut off a current in an opposite direction to the output current.

6. The power supply system according to claim 3, wherein a backflow prevention diode and a switch are provided on the first power line between the pair of first terminals, the backflow prevention diode being configured to allow an output current of the main DC power supply and cut off a current in an opposite direction to the output current, the switch being configured to interrupt a bypass line bypassing the backflow prevention diode.

7. The power supply system according to claim 4, wherein a backflow prevention diode and a switch are provided on the first power line between the pair of first terminals, the backflow prevention diode being configured to allow an output current of the main DC power supply and cut off a current in an opposite direction to the output current, the switch being configured to interrupt a bypass line bypassing the backflow prevention diode.

8. The power supply system according to claim 1, further comprising a power supply driver that changes the voltage between the pair of first terminals from 0 to a predetermined maximum voltage by operating the first variable voltage power supply.

9. The power supply system according to claim 1, further comprising a switching circuit driver that operates the arm switch, wherein the switching circuit driver executes switching control to alternately turn on and off the arm switch within a period in which the voltage between the pair of first terminals is equal to or less than a predetermined voltage threshold value or in which the output power of the first variable voltage power supply is not superimposed on the first and second power lines, and maintains the arm switch in either an on or off state within a period in which the voltage between the pair of first terminals is higher than the predetermined voltage threshold value or in which the output power of the first variable voltage power supply is superimposed on the first and second power lines.

10. The power supply system according to claim 1, further comprising a second variable voltage power supply that outputs power of a variable voltage from a pair of output terminals, wherein the pair of output terminals are both connected to the first power line or the second power line.

11. The power supply system according to claim 2, wherein a backflow prevention diode is provided on the first power line between the pair of first terminals to allow an output current of the main DC power supply and cut off a current in an opposite direction to the output current.

12. The power supply system according to claim 2, further comprising a power supply driver that changes the voltage between the pair of first terminals from 0 to a predetermined maximum voltage by operating the first variable voltage power supply.

13. The power supply system according to claim 2, further comprising a switching circuit driver that operates the arm switch, wherein the switching circuit driver executes switching control to alternately turn on and off the arm switch within a period in which the voltage between the pair of first terminals is equal to or less than a predetermined voltage threshold value or in which the output power of the first variable voltage power supply is not superimposed on the first and second power lines, and maintains the arm switch in either an on or off state within a period in which the voltage between the pair of first terminals is higher than the predetermined voltage threshold value or in which the output power of the first variable voltage power supply is superimposed on the first and second power lines.

14. The power supply system according to claim 2, further comprising a second variable voltage power supply that outputs power of a variable voltage from a pair of output terminals, wherein the pair of output terminals are both connected to the first power line or the second power line.

15. The power supply system according to claim 3, wherein a backflow prevention diode is provided on the first power line between the pair of first terminals to allow an output current of the main DC power supply and cut off a current in an opposite direction to the output current.

16. The power supply system according to claim 3, further comprising a power supply driver that changes the voltage between the pair of first terminals from 0 to a predetermined maximum voltage by operating the first variable voltage power supply.

17. The power supply system according to claim 3, further comprising a switching circuit driver that operates the arm switch, wherein
the switching circuit driver executes switching control to alternately turn on and off the arm switch within a period in which the voltage between the pair of first terminals is equal to or less than a predetermined voltage threshold value or in which the output power of the first variable voltage power supply is not superimposed on the first and second power lines, and maintains the arm switch in either an on or off state within a period in which the voltage between the pair of first terminals is higher than the predetermined voltage threshold value or in which the output power of the first variable voltage power supply is superimposed on the first and second power lines.

18. A power supply system that converts DC power into AC power and supplies the power to a load, the power supply system comprising:
a power supply that outputs the DC power to a first power line and a second power line;
a switching circuit including a plurality of arm switches that connect the first and second power lines and the load; and
a switching circuit driver that operates the arm switches, wherein
the power supply superimposes power of a variable voltage on the DC power, and outputs power having a voltage that fluctuates in a predetermined cycle to the first and second power lines.

19. The power supply system according to claim 18, wherein the switching circuit driver executes switching control to alternately turn on and off the arm switch within a period in which the voltage between the first and second power lines is equal to or less than a predetermined voltage threshold value or in which the output power of a variable voltage is not superimposed on the first and second power lines, and maintains the arm switch in either an on or off state within a period in which the voltage between the first and second power lines is higher than the predetermined voltage threshold value or in which the output power of a variable voltage is superimposed on the first and second power lines.

20. A moving body comprising:
an AC rotating electrical machine coupled to drive wheels;
a DC power supply that outputs DC power;
a U-phase variable voltage power supply that outputs power of a variable voltage;
a V-phase variable voltage power supply that outputs power of a variable voltage;
a W-phase variable voltage power supply that outputs power of a variable voltage;
a first U-phase power line and a second U-phase power line that connect both ends of a U-phase leg connected to a U-phase of the AC rotating electrical machine and both electrodes of the DC power supply;
a first V-phase power line and a second V-phase power line that connect both ends of a V-phase leg connected to a V-phase of the AC rotating electrical machine and both electrodes of the DC power supply; and
a first W-phase power line and a second W-phase power line that connect both ends of a W-phase leg connected to a W-phase of the AC rotating electrical machine and both electrodes of the DC power supply, wherein
the U-phase variable voltage power supply includes a pair of output terminals connected to the first U-phase power line,
the V-phase variable voltage power supply includes a pair of output terminals connected to the first V-phase power line, and
the W-phase variable voltage power supply includes a pair of output terminals connected to the first W-phase power line.

* * * * *